United States Patent
Kohli

(10) Patent No.: US 9,787,372 B2
(45) Date of Patent: Oct. 10, 2017

(54) SINGLE FREQUENCY DATA NETWORK

(71) Applicant: Facebook, Inc., Menlo Park, CA (US)

(72) Inventor: Sanjai Kohli, Manhattan Beach, CA (US)

(73) Assignee: Facebook, Inc., Menlo Park, CA (US)

( * ) Notice: Subject to any disclaimer, the term of this patent is extended or adjusted under 35 U.S.C. 154(b) by 116 days.

(21) Appl. No.: 14/878,974

(22) Filed: Oct. 8, 2015

(65) Prior Publication Data

US 2016/0127977 A1 May 5, 2016

Related U.S. Application Data

(63) Continuation of application No. 14/214,957, filed on Mar. 16, 2014, now Pat. No. 9,215,644.

(Continued)

(51) Int. Cl.
| | |
|---|---|
| *H04B 7/0408* | (2017.01) |
| *H04W 4/14* | (2009.01) |
| *H04W 40/14* | (2009.01) |
| *H04W 40/02* | (2009.01) |
| *H04W 40/12* | (2009.01) |
| *H04W 24/04* | (2009.01) |

(Continued)

(52) U.S. Cl.
CPC ......... *H04B 7/0408* (2013.01); *H04B 7/0617* (2013.01); *H04B 15/00* (2013.01); *H04L 45/02* (2013.01); *H04L 45/22* (2013.01); *H04L 45/46* (2013.01); *H04W 16/28* (2013.01); *H04W 24/02* (2013.01); *H04W 24/04* (2013.01); *H04W 24/10* (2013.01); *H04W 28/18* (2013.01); *H04W 40/02* (2013.01); *H04W 40/12* (2013.01); *H04W 40/14* (2013.01); *H04W 40/16* (2013.01); *H04W 40/34* (2013.01); *H04W 52/42* (2013.01); *H04W 56/00* (2013.01); *H04W 72/0453* (2013.01); *H04W 72/0473* (2013.01); *H04W 72/085* (2013.01); *H04W 72/1263* (2013.01); *H04L 1/1867* (2013.01); *H04W 72/00* (2013.01); *H04W 84/22* (2013.01); *Y02B 60/50* (2013.01)

(58) Field of Classification Search
CPC ..... H04L 45/123; H04L 45/124; H04L 45/22; H04L 41/0654; H04W 40/04; H04W 40/34

See application file for complete search history.

(56) References Cited

U.S. PATENT DOCUMENTS 9,215,644 B2 * 12/2015 Kohli .................. H04B 7/0617
9,277,480 B2 * 3/2016 Kohli .................. H04B 7/0617
(Continued)

FOREIGN PATENT DOCUMENTS

JP WO 2012093429 A1 * 7/2012 ............. H04L 45/54

OTHER PUBLICATIONS

Corrected Notice of Allowability dated Jan. 15, 2016, for U.S. Appl. No. 14/214,956 by Kohli, S., filed Mar. 16, 2014.
(Continued)

*Primary Examiner* — Benjamin H Elliott, IV

(57) ABSTRACT

A Next Generation Data Network is described. It leverages the "cloud" for data management, frequency data computation and analytics. Packets are transmitted at times and in directions to minimize interference between nodes in the network. The wireless network is a single frequency network that permits limited non-line-of-sight operation.

18 Claims, 19 Drawing Sheets

Related U.S. Application Data

(60) Provisional application No. 61/789,188, filed on Mar. 15, 2013.

(51) Int. Cl.

| | | |
|---|---|---|
| *H04B 15/00* | (2006.01) | |
| *H04L 12/707* | (2013.01) | |
| *H04W 40/34* | (2009.01) | |
| *H04W 72/04* | (2009.01) | |
| *H04W 28/18* | (2009.01) | |
| *H04W 56/00* | (2009.01) | |
| *H04L 12/751* | (2013.01) | |
| *H04L 12/715* | (2013.01) | |
| *H04W 72/12* | (2009.01) | |
| *H04W 24/02* | (2009.01) | |
| *H04W 52/42* | (2009.01) | |
| *H04W 72/08* | (2009.01) | |
| *H04W 16/28* | (2009.01) | |
| *H04W 24/10* | (2009.01) | |
| *H04W 40/16* | (2009.01) | |
| *H04B 7/06* | (2006.01) | |
| *H04W 72/00* | (2009.01) | |
| *H04L 1/18* | (2006.01) | |
| *H04W 84/22* | (2009.01) | |

(56) References Cited

U.S. PATENT DOCUMENTS

| | | | |
|---|---|---|---|
| 9,473,221 B2* | 10/2016 | Kohli | H04B 7/0617 |
| 9,537,545 B2* | 1/2017 | Kohli | H04B 15/00 |
| 2004/0146043 A1 | 7/2004 | Hiraoka et al. | |
| 2005/0283643 A1 | 12/2005 | Banerjee et al. | |
| 2006/0114818 A1 | 6/2006 | Canali et al. | |
| 2006/0146696 A1 | 7/2006 | Li et al. | |
| 2007/0230639 A1 | 10/2007 | Stirling-Gallacher | |
| 2008/0069034 A1 | 3/2008 | Buddhikot et al. | |
| 2008/0090575 A1 | 4/2008 | Barak et al. | |
| 2008/0095167 A1* | 4/2008 | Bruss | H04L 47/34 |
| | | | 370/394 |
| 2008/0248802 A1 | 10/2008 | Krishnamoorthy et al. | |
| 2010/0080119 A1 | 4/2010 | Ansorge | |
| 2010/0177664 A1 | 7/2010 | Thoumy et al. | |
| 2011/0038253 A1 | 2/2011 | Yabusaki et al. | |
| 2011/0045767 A1 | 2/2011 | Rofougaran et al. | |
| 2011/0103503 A1 | 5/2011 | Shin et al. | |
| 2011/0159821 A1 | 6/2011 | Park | |
| 2011/0182253 A1* | 7/2011 | Shekalim | H04W 28/18 |
| | | | 370/329 |
| 2011/0223964 A1 | 9/2011 | Ebiko | |
| 2011/0317587 A1* | 12/2011 | Lida | H04L 12/2832 |
| | | | 370/254 |
| 2012/0011365 A1 | 1/2012 | Schmidt et al. | |
| 2012/0063447 A1 | 3/2012 | Tyrrell et al. | |
| 2013/0089042 A1 | 4/2013 | Negus et al. | |
| 2013/0095874 A1 | 4/2013 | Moshfeghi | |
| 2013/0128726 A1 | 5/2013 | Hellhake et al. | |
| 2013/0176874 A1 | 7/2013 | Xu et al. | |
| 2013/0201857 A1 | 8/2013 | Bhargava et al. | |
| 2013/0301619 A1 | 11/2013 | Singh et al. | |
| 2014/0074392 A1 | 3/2014 | Holm et al. | |
| 2014/0086080 A1 | 3/2014 | Hui et al. | |
| 2014/0269671 A1* | 9/2014 | Kalkunte | H04W 56/0005 |
| | | | 370/350 |
| 2014/0286156 A1 | 9/2014 | Kohli et al. | |
| 2014/0286251 A1 | 9/2014 | Kohli et al. | |
| 2015/0094025 A1 | 4/2015 | Chen | |
| 2016/0028610 A1* | 1/2016 | Kohli | H04B 7/0617 |
| | | | 370/336 |
| 2016/0036500 A1* | 2/2016 | Kohli | H04B 7/0617 |
| | | | 370/329 |
| 2016/0037431 A1* | 2/2016 | Kohli | H04B 7/0617 |
| | | | 370/225 |
| 2016/0127977 A1* | 5/2016 | Kohli | H04B 7/0617 |
| | | | 370/328 |
| 2016/0226563 A1* | 8/2016 | Kohli | H04L 45/22 |
| 2016/0226569 A1* | 8/2016 | Kohli | H04B 7/0617 |

OTHER PUBLICATIONS

Notice of Allowance dated Nov. 3, 2015, for U.S. Appl. No. 14/214,957 of Kohli, S., filed Mar. 16, 2014.
Notice of Allowance dated Sep. 29, 2015, for U.S. Appl. No. 14/214,957 of Kohli, S., filed Mar. 16, 2014.
Notice of Allowance dated Oct. 21, 2015, for U.S. Appl. No. 14/214,956 by Kohli, S., filed Mar. 16, 2014.
U.S. Appl. No. 14/214,956 by Kohli, S., filed Mar. 16, 2014.
U.S. Appl. No. 14/214,957 by Kohli, S., filed Mar. 16, 2014.
U.S. Appl. No. 14/878,943 by Kohli, S., filed Oct. 8, 2015.
U.S. Appl. No. 14/878,960 by Kohli, S., filed Oct. 8, 2015.
U.S. Appl. No. 14/878,982 by Kohli, S., filed Oct. 8, 2015.

* cited by examiner

SINGLE FREQUENCY DATA NETWORK

CROSS-REFERENCE TO RELATED APPLICATION(S)

The present application is a continuation of U.S. patent Ser. No. 14/214,957, filed on Mar. 16, 2014, entitled "Distribution Node and Client Node for Next Generation Data Network," which is related to and claims priority under 35 U.S.C. 119(e) to U.S. provisional patent application, Ser. No. 61/789,188, entitled "Next Generation Data Network," filed on Mar. 15, 2013. The contents of these applications are hereby incorporated by reference in their entirety.

TECHNICAL FIELD

The present disclosure relates generally to wireless communication. In particular, the present disclosure relates to methods and systems for controlling a multi-hop mesh wireless data network.

BACKGROUND

Data networks have traditionally been wired, either copper or fiber. Wireless spectrum has typically been used for subscriber links, not Data Infrastructure. The advent of micro cells, pica cells, nano cells, and hotspots has made the provisioning of wired Data prohibitively expensive. This is a result of inflexibility of wired networks; cable has to be run to add new points of presence. In many cases, this requires that streets be torn up.

Wireless Data networks can be much more flexible, and hence more economically viable. However, existing wireless Data network architectures limit this flexibility in several ways. One common form of wireless Data networks uses point-to-point radio links, typically operating in the microwave or millimeter wave bands.

Another common form of wireless Data networks use a cellular architecture. These networks are based on frequency reuse. Typically a cellular reuse scheme where the total available frequency spectrum is divided into sub bands. "colors", which are reused in disjoint geographical areas, "cells". For example, reuse factors of 4, 7, and 12 are popular. Other systems reuse time, polarization, or code. The disadvantage of all of these fixed, "cellular", reuse schemes are that they are inefficient, resources are wasted. For example, in a 7 to 1 frequency cellular reuse system, only 1/7-th of the total available frequency spectrum is available in a single cell, even if none of the adjacent cells are being used. Another disadvantage of these frequency reuse schemes is that it is difficult to add more cells in an area of high demand.

SUMMARY

This invention is a wireless Data network that reuses the same frequency band in all cells. For example, if the frequency band is divided into three frequency channels, all three of these channels are available to every node in the network. Frequency channels are dynamically assigned by the Cloud to maximize network capacity taking into account potential interference from both other links in the network and from other sources. This is distinct from previous systems which try to maximize C/(N+1), ratio of carrier power to combined noise plus interference power. Further, the system dynamically adjusts route and frequency channel assignments, transmit power, modulation, coding, and symbol rate to maximize network capacity and probability of packet delivery, rather than trying to maximize the capacity of any one link.

The Next Generation Network is a time domain duplex (TDD) system (it can also be Frequency domain duplex, however the TDD is the more complex case, hence explained in detail). All sectors of each node transmit or receive at the same time. They are synchronized by a master controller. This allows the use of a single frequency across all sectors and mitigates adjacent channel interference. It is a multipoint system where there is no limit to how many nodes a node can communicate with, Each sector on each node has a 2D or 3D beamforming capability. This permits the unit to form a high gain beam that is pointed at the destination node and packet sent. The receiving node does the same it forms a high gain narrow beam pointed at the transmitting node. Beam coefficients are grossly computed in the cloud and fine-tuned between the units.

The network uses two forms of route adjustment. A mesh network topology is used to allow traffic to be routed between two nodes via at least two geographically independent paths. This provides load balancing, so that when one path becomes congested or degraded, traffic can be routed around it. It also mitigates the effects of external interference. The second form of route adjustment is "micro-routes". Rather than just pointing the receive antenna at the transmitter, or pointing the transmit antenna at the receiver, this invention takes advantage of multipath to use indirect (non-line-of-sight) paths in addition to the direct (line-of-sight) path. The ability to use these paths provides several advantages. One is interference avoidance. Any interference that was arranging along the main beam will be mitigated by pointing away from it. Another is obstacle avoidance. The micro route can be used to mitigate obstacles, such as trees, signs, trucks, or similar that blocks the direct line-of-sign path. Further, by pre-computing these reflected routes they can be applied in real time.

Frequency channel assignments, transmit power, modulation, coding, and symbol rate for each link, both direct path and micro route, are dynamically optimized in the Cloud to maximize network capacity. Each node transmits probe packets to each of its neighbor nodes that can be n layers deep using a synchronous scheme. During a time interval know to its neighbors, the node transmits probe packets in various directions with a known pattern. The neighbor nodes listen for each of these transmissions in various directions, and record the received channel measurements. These measurements are periodically uploaded to the Cloud and processed. The processing identifies the viable micro routes and determines the range of link parameters available for each. This processing takes into account the received signal strength of the probe packets in each receive direction for each transmit direction, It also takes account of the reverse measurements, those made by the other node with its receive direction pointed in the previous transmit direction and with first nodes transmit direction pointed in the direction of the previous receive direction. Data is processed over time to identify static routes, those that are available over long periods of time, and periodic routes, those that are repeatedly available at certain times of day.

The received signal strength data collected by each unit is sent to the Cloud server for processing. This data consists of transmit angles, which in one embodiment of the invention are represented by beamforming parameters, and receive angles, which in the same embodiment of the invention are represented by beamforming parameters, and received signal transmit power.

A data processing function in the Cloud processes the data to identify micro-routes, reflected paths and interference levels between units. In an alternate embodiment of the invention, the processing is performed in each unit. In another alternate embodiment, the processing is performed in selected units. For each micro-route, the Cloud processor determines a set of signal parameters to be used for that route. These parameters are the transmit power level, beam pointing/forming coefficients plus modulation and coding. In one embodiment of this invention, transmit constellation pre-distortion parameters are included in the signal parameter set.

The RF mapping function is performed every 60 seconds. In alternate embodiments of this invention, it is performed at different rates. In one alternate embodiment, it is performed whenever capacity utilization is low. The RF mapping data is collected incrementally, distributed over time in different sections of the network. In another embodiment of the invention, the two units at the end points of a micro-route negotiate evaluations of beam pointing perturbations to optimize performance over time.

Meteorological data (weather forecasts) of rain and wind storms is used to identify phenomena, which might impact RF link performance. When a link degrades due to rain, the meteorological data is used to predict the motion of the rain microcell, These predictions are used to route traffic around the rain microcell to accommodate the reduced link capacity.

In high wind conditions, or when the structural mount is flexible, the beams are widened to maintain lock when the antennas are moved by the wind. To compensate for the widened, lower gain beams, the Cloud also reduces the data rate on these links. Wind direction is used by the Cloud to anticipate the need for beam widening.

Coarse beam parameters are computed on the server. These are geometric in nature and downloaded to the unit. Further the server can also compute perturbations on these parameters that the unit can try and then categorize by performance.

The Next Generation Network mitigates external interference is several ways:
1. By changing frequency channel
2. By using a reroute (route diversity) to avoid an interfered link
3. 13 u using a micro-route to "look away" from the interference
4. By using a spatial interference canceller
5. By using a spatial interference canceller and a micro-route if the interference is along the original path or if additional interference suppression is required
6. By using adaptive modulation and coding
7. By using adaptive modulation and coding with any of the other techniques

DETAILED DESCRIPTION

Figure 1:
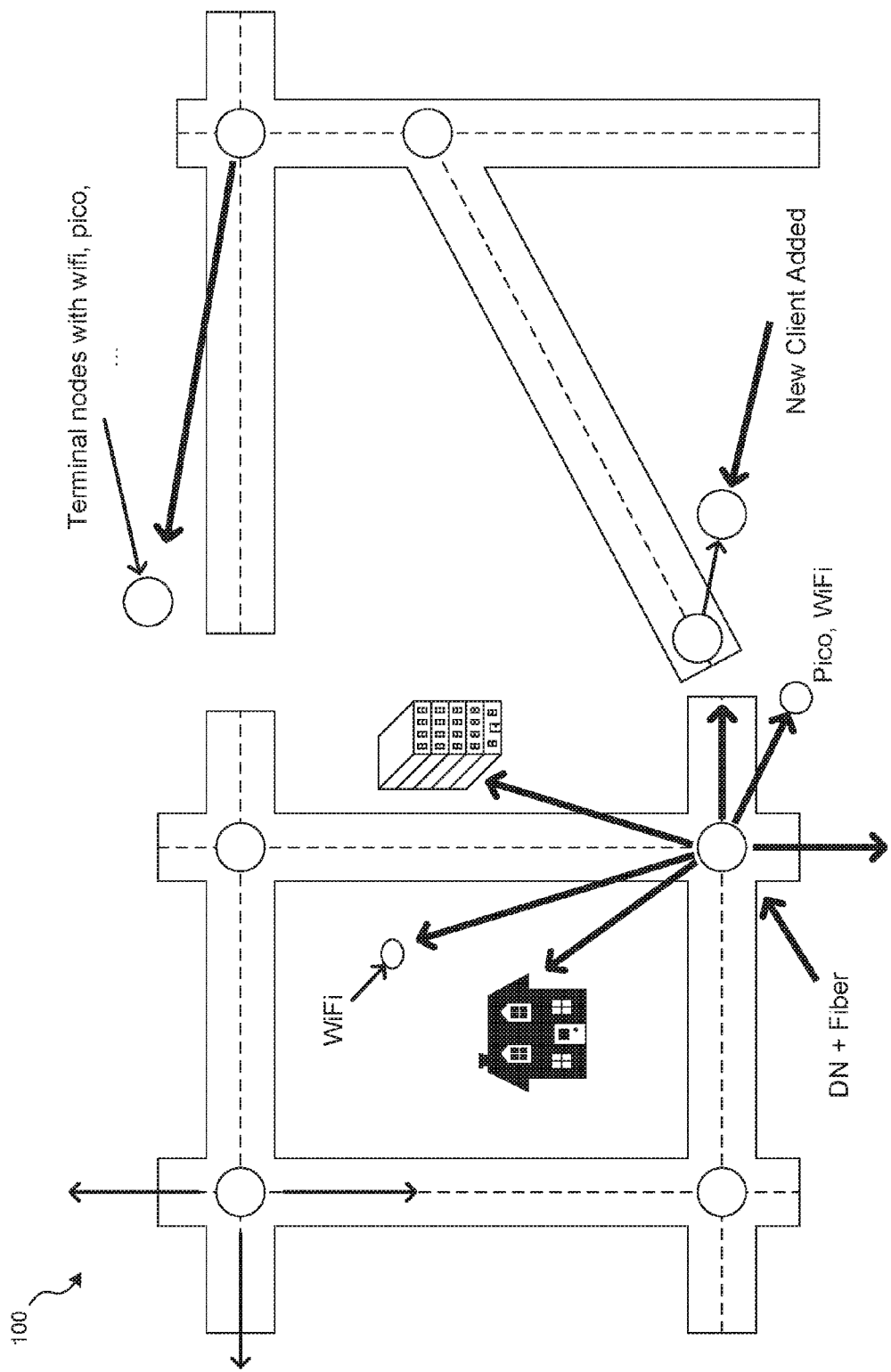
FIG. 1 shows a topology of the next generation data network, in accordance with one embodiment of the present invention.
Figure 2:
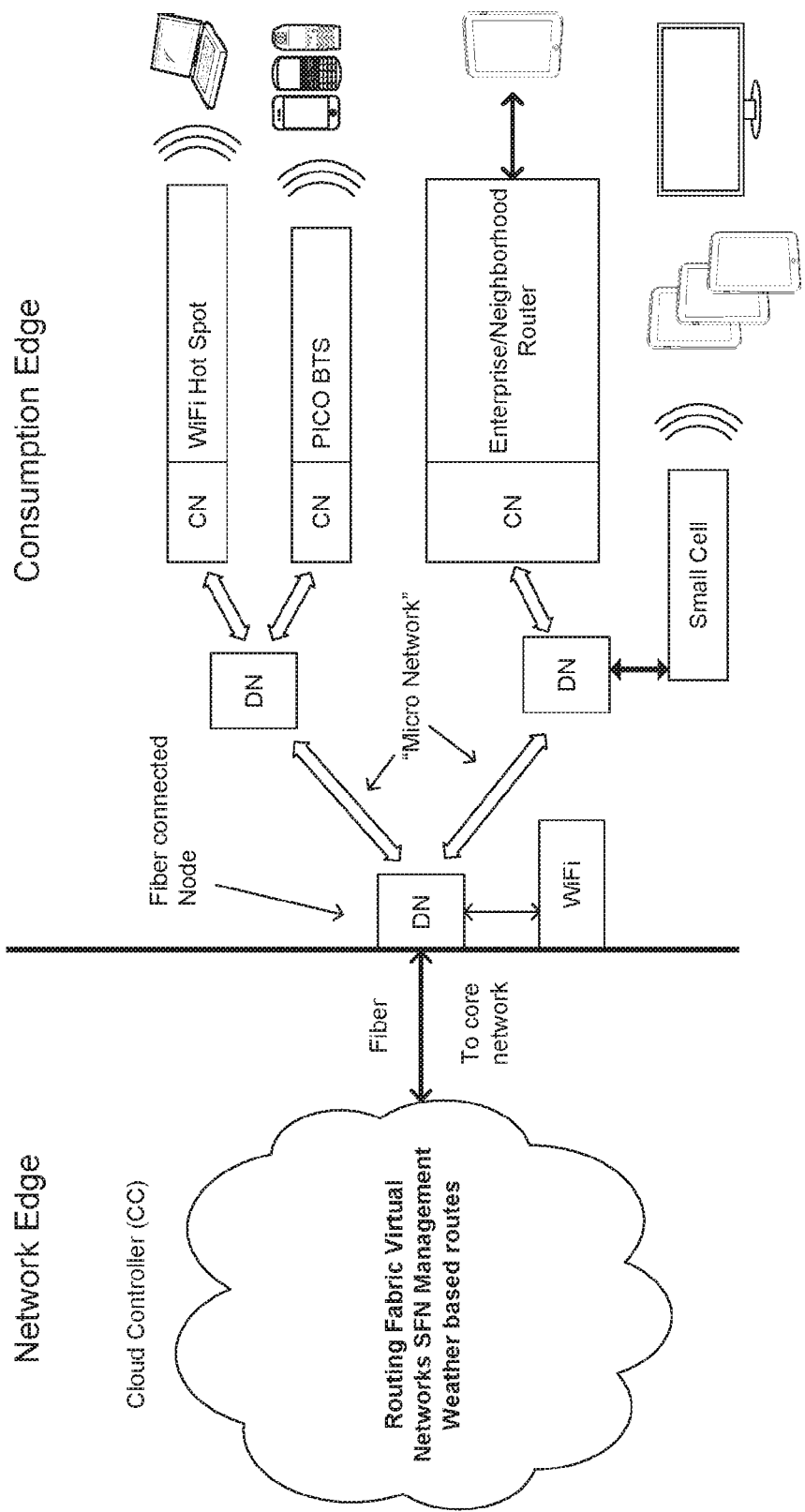
FIG. 2 shows the deployment of the distribution nodes (DNs), client nodes (CNs), and a cloud controller (CC) in the next generation data network, in accordance with one embodiment of the present invention.

The Next Generation Data Networks topology is shown in FIG. 1. The network 100 (FIG. 2) consists of Distribution Nodes (DNs), Client Nodes (CNs), and a Cloud Controller (CC), The Distribution Nodes (FIG. 3) may connect to a fiber point of presence to get or send data from the "cloud", The distribution nodes can talk with other distribution nodes and client nodes, The DN has one to four sectors 302, 304, 306, 308. The Client Nodes have one or two sectors. The Cloud Controller manages routing and network performance analysis. A network may have multiple fiber connected nodes that can be used for redundancy and/or to distribute traffic entry/exit points, These networks can be further split into subnets 402, 404 each associated with a subset of fiber connected nodes (FIG. 4). These subnets are time synchronized to minimize interference and edge effects between the subnets. Frequency channels may also be managed between these subnets to minimize interference between the subnets.

The Cloud Controller computes all of the routes from each Distribution Node to each of the Client Nodes and generates routing tables for each Distribution Node to/from each of its Client Nodes. These routing tables are downloaded into the nodes. The tables tell each node how to route a packet to its destination. Each node has its own MAC address. The cloud has a bird's eye view of the network as it collects statistics on each link to characterize it. These statistics are (but not restricted to) packet loss, obstructions and signal attenuation, structure rigidity, available of single or multiple micro routes. Using this data it computes predicted probability of packet delivery for each MAC address serviced by that DN. Another option is for the CC function to download all routes to the fiber connected DNs, and to each DN—incremental routes to destination MAC addresses and micro routes relevant to that DN. An example of the schedule is:

Macro Routing (Once/10 sec)
Cloud computes all possible routes between fiber nodes and MAC addresses;
Uplink & downlink;
Cloud Ranks these routes;
Routes are weighted with link quality, speed, time of day, and traffic congestion;
For each MAC address we have primary and several alternate routes that are pre-computed with a cost function;
Cloud refreshes ranking—no faster than once every 10 seconds;
Refresh triggered by a substantial change in link quality;
Refresh includes transmit parameters of links;
Route probe commands;
The cloud keeps alternate routes alive with pings and pre-scheduled slots.
Micro Routing (Once/hr.)
Cloud refreshes micro routes & ranking every hour based on RF map updates & Route Probes.
Exception Pairs (Once/hr.)
Exception transmit receive pairs for SFNs are recomputed every hour.

The other functions performed by the cloud controller is creation of RF Maps, management and command of data collection by nodes, analyses of link performance data collected by the nodes, determination of transmit power levels for the nodes and clients that are dependent on the destination of the packet. The cloud controller also performs management of the single frequency network, virtual networks, sub nets, and coexistence with other networks. The cloud controller may also manage interference at the node level or have the fiber connected node and the node itself manage these functions depending on timeliness of a response from the cloud controller in response to changing conditions.

When a fiber connected node receives a packet, either from the fiber for a Distribution node, or from a client for any node, it finds the destination MAC address in its routing table, and appends the routing header specified in the table to that packet. The packet is then transmitted to the next node in the header. The header entry tells the node which sector and beam number in that sector to use. Prior to transmission the sending node strips the header entry it just used from the packet to expose the next entry which will be used by the receiving node.

To implement load balancing, the Cloud Controller includes two, or more, entries in the routing table for a given destination node. Each entry has an assigned probability. The sum of the probabilities for a given destination is always one. Thus if there is only one entry, the assigned probability value is 1. If there are more than two entries for a given destination, the sending node generates a random value between 0 and 1. If the value is less than the probability assigned to the first entry, that entry is used. If not, the value is compared to the sum of the probabilities assigned to the first two entries. If the value is less than this sum, the second entry is used. If there are more than two entries, this procedure is repeated until the packet is sent. Further, the rules or cost function used for routing can consist of (but not restricted to)

No Exception Routing Pairs (SFN)

Figure 5:
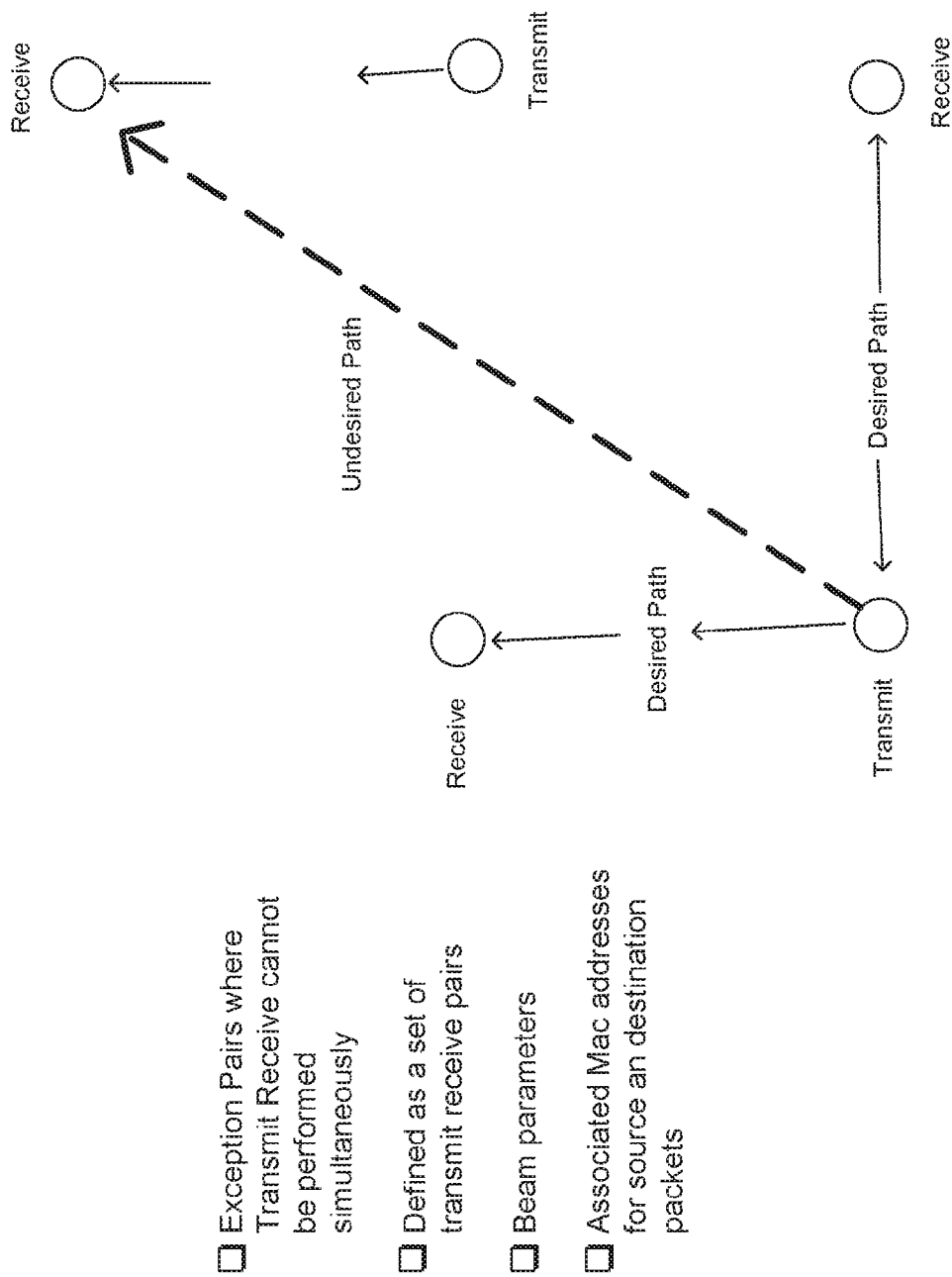
FIG. 5 shows a transmit/receive exception pair characterized by the RF map function as an undesirable path in the next generation data network, in accordance with one embodiment of the present invention.

For SFN operation we create transmit and receive exception pairs (FIG. 5) derived by the RF Maps function. That is, if a transmitter is sending a packet to a client/DN with a specific beam type (main or micro route), that may interfere with other units. We ensure if these units are receiving at that time that their main beams are not pointed in the interference direction. This can be achieved in two ways one is leave the receive slot empty or option 2 (the preferred option) is to order the packets so that the receiver and transmitter have their beams occupied in different directions. Exception pair may also be created to prevent overlapped transmission beams of two adjacent sectors of the DN from interfering with one another.

Only Terminal Traffic on Low Reliability Links

On low reliability links where the net data throughput is low we may want to restrict traffic over those links to traffic where the destination MAC addresses are only reachable by going over those links. Further, we leverage the fact that traffic density on a link decreases exponentially on average as we move away from the fiber connected node. This gives us excess unused capacity on most links that are I or more hops away from the fiber connected node.

Lower Modulation/Higher Error Coding on Low Reliability Links

We can further enhance the performance of these links by slowing down the payload rate to ensure timely packet delivery by reducing the modulation complexity (qam16 to qpsk for example) for example and/or increase the error coding (Rate ¾ to rate ½ code for example).

Lower Modulation on Sparse Data Traffic Links

On links with sparse data that is a lot of unused capacity we can reduce the modulation and increase the error coding to achieve a higher reliability of packet delivery.

Double Packet Routes of Trunk Data Over Lossy Links

High priority packets and "trunk" data (that is data that needs to be forwarded on) can be sent over multiple routes simultaneously. Further large packets can be broken down into smaller packets as that may preserve the integrity of the packets that are being received from different directions.

Maximization of Probability of Packet Delivery

The above mentioned technique may be used in addition to algorithm choosing links for the route that maximize the probability of packet delivery, The fiber connected node and the cloud routing & processing function are compiling statistics on each link that are being used to predict future performance of each link.

A Minimization of Hops

If the probability of packet delivery is the same on two routes, and there is no congestion, the route with the lower number of hops will be chosen.

The Next Generation Data Network 100 implements two forms of route adjustment. The network topology allows packets to be routed between two nodes via at least two spatially independent paths 702, 704. This provides load balancing, so that when one path becomes congested or degraded, traffic can be routed around it. It also mitigates the effects of external interference. The second form of route adjustment is "micro-routes" 602. Rather than pointing the receive antenna at the transmitter, or pointing the transmit antenna at the receiver, this invention takes advantage of multipath to use indirect (non-line-of-sight) paths. The ability to use these paths provides several advantages. One is interference avoidance. Any interference that was aligned with the main beam is mitigated by pointing away from it. Another is obstacle avoidance. The micro-route 602 can be used to mitigate obstacles, such as trees, signs, trucks, or similar objects that block the direct line-of-sight path.

Frequency channel assignments, beam forming coefficients, transmit power, modulation, coding, and symbol rate for each link, both direct path and micro-rout; are dynamically optimized by the Cloud Controller to maximize network capacity. The two nodes have the option of further optimizing the cloud computed beam parameters to include multipath effects, unit misalignment, calibration & temperature dependent errors, etc.

Each node transmits probe packets to each of its four neighbor nodes using a synchronous scheme. During a time interval know to its neighbors, the node transmits probe packets in various directions with a known pattern. The neighbor nodes listen for each of these transmissions in various directions, and record the received channel measurements. These measurements are periodically uploaded to the Cloud Processor and processed. The processing identifies the viable micro-routes and determines the range of link parameters available for each. This processing takes into account the received signal strength of the probe packets in each receive direction for each transmit direction. It also takes account of the reverse measurements, those made by the first node with its receive direction pointed in the previous transmit direction and with second nodes transmit direction pointed in the direction of the previous receive direction. Data is processed over time to identify static routes, those that are available over long periods of time, and periodic routes, those that are repeatedly available at certain times of day.

To mitigate the impact of lossy links, retransmissions are used. The receiving node is capable of receiving fragments of a packet over time on the same link or distributed over other links and reassembling them. When lossy links are detected, the sending node fragments the packet and sends copies of fragments using different routes to achieve route diversity and increase the probability of packet delivery. The node can tradeoff the losses between all of the entries in the routing table for a given destination node, including the direct-route and a micro-route. If the losses on the micro-route are lower it may choose to use the micro-route for packet delivery.

For a link that is unresponsive, due to a physical blockage or radio interference, on the path, the transmit node tries to establish communication on a "micro-route". It may try multiple micro-routes. If that fails it returns the packet (or packet number) to the last unit ($DN_{n-1}$ unit) that sent it.

Figure 6:
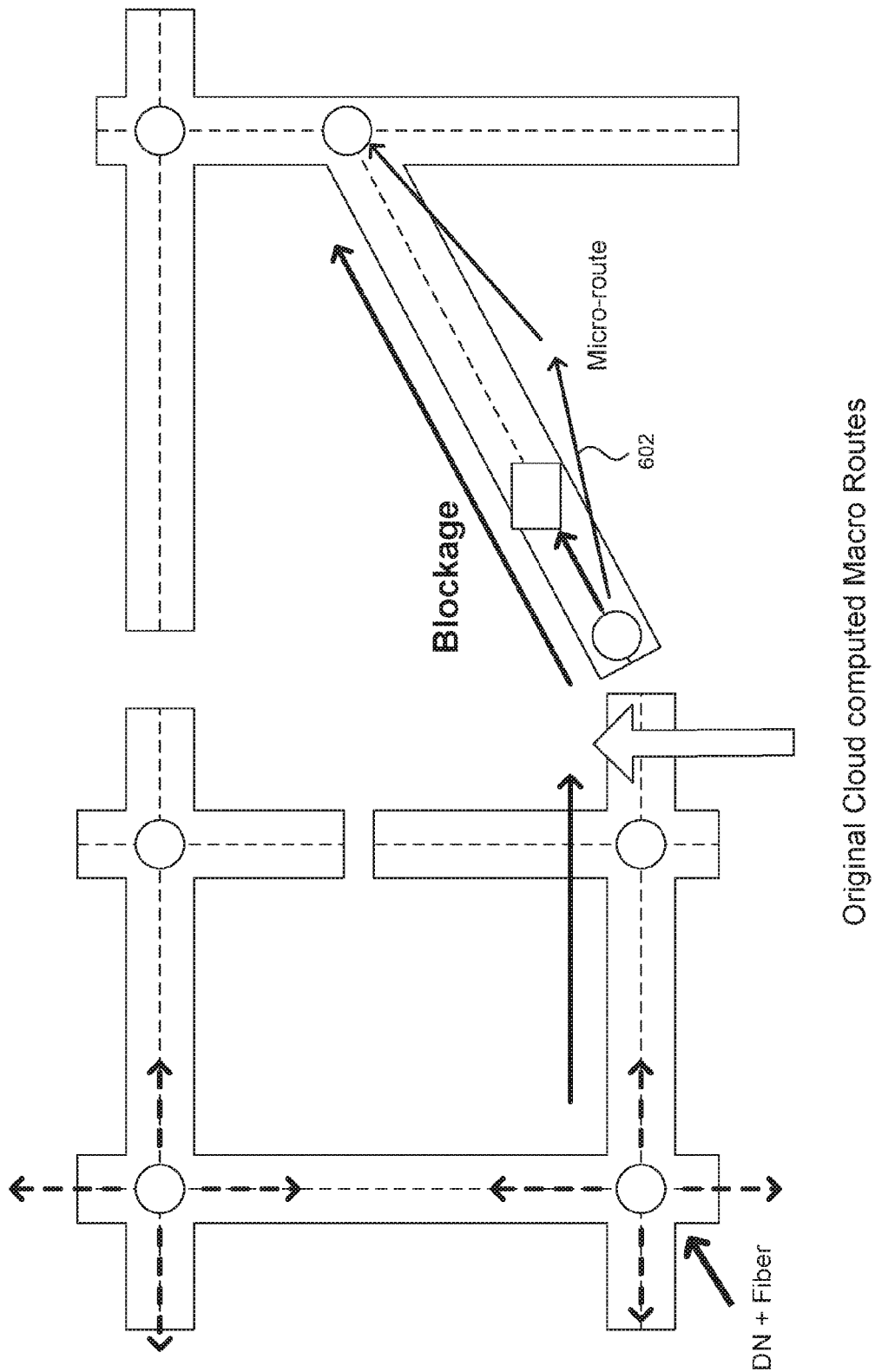
FIG. 6 shows a micro route around a physical or interference blockage in the next generation data network, in accordance with one embodiment of the present invention.
Figure 7:
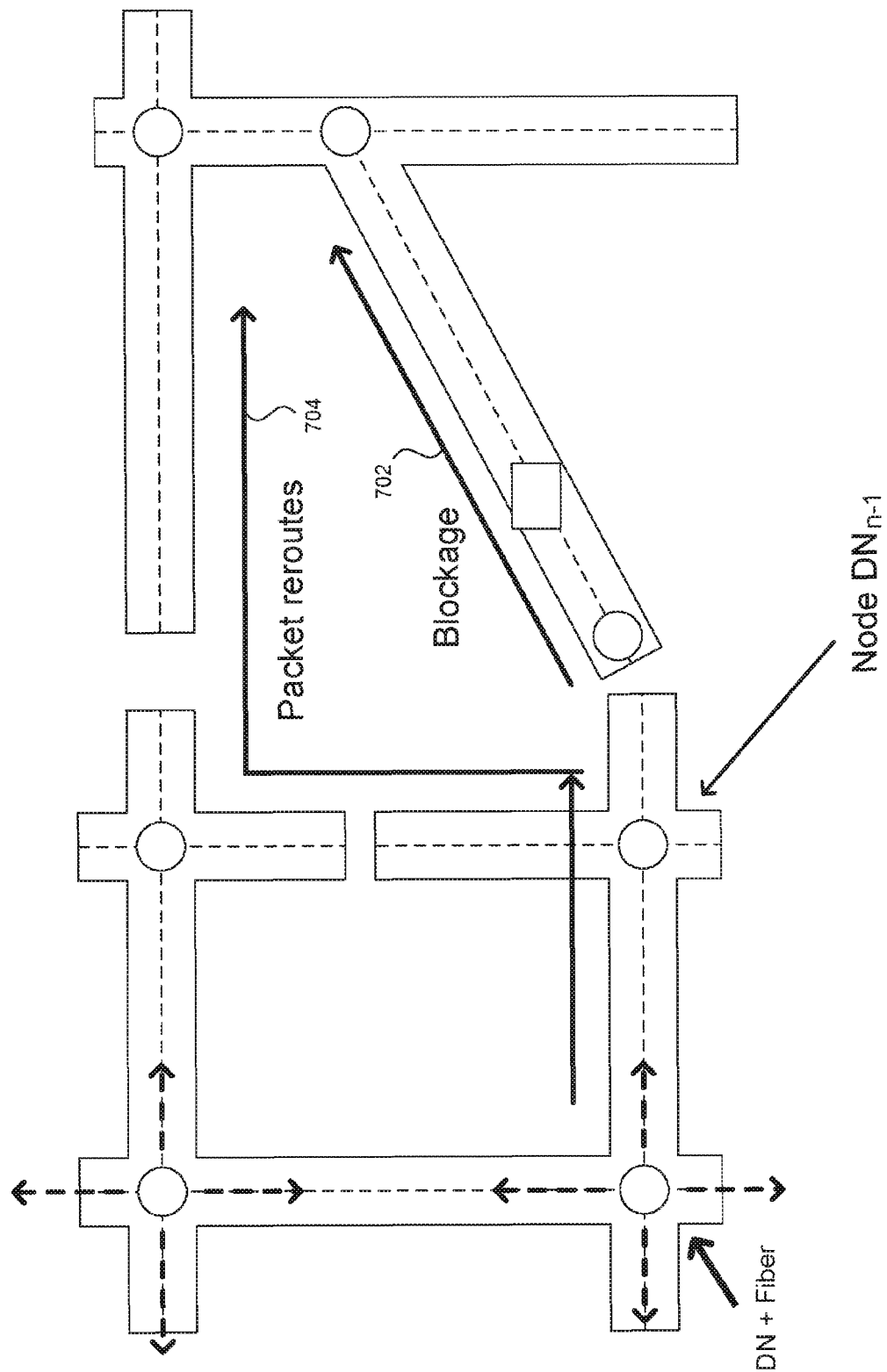
FIG. 7 shows a re-route around a physical or interference blockage in the next generation data network, in accordance with one embodiment of the present invention.

For rerouting, FIGS. 6 and 7, the node has a list of alternate routes 702, 704 for each destination node pre-computed by the Cloud Controller. The node modifies the routing header using one of these and retransmits the packet. It is entirely possible that the packet (or packet identifier) may retrace several steps before it gets on a new route.

Further, this unit deletes routes that contain the failed route from its list. This is also done at the fiber connected node and all other nodes in the network. Only the cloud computation can reestablish this route. The deletion can be done based on persistence or on just one occurrence of failure.

All communication failures, link SNR etc. are communicated back to the fiber node and the cloud.

Each sector of the node is equipped with an FFT, which runs over the entire spectrum creating a power spectral density map or a "spectrum analyzer". This data is used by the Cloud Controller to select the frequency of the link. The transmit and receive frequencies can be different and are determined by the interference at the receiver rather than at the transmitter. Further each sector of the node can operate on a different frequency.

For each fiber point or broadband point of presence (a high bandwidth link for taking and bringing data from carrier/internet) and each destination MAC address on the network, the Cloud pre-computes the possible routes with a cost function. The net of the cost function is characterized in data rate, delay, and reliability of packet delivery. It also takes into account the availability of multiple routes between two units using micro routes.

Once a unit determines it cannot communicate on its primary path it utilizes pre-stored micro routes or an alternate path computed by the Cloud. If these fail it sends the packet back to the $DN_{n-1}$. $DN_{n-1}$ has a list of pre-computed routes for a destination mac address. $DN_{n-1}$ replaces the packet routing header with one of the pre-computed routes 704 that does not utilize a "failed" route 702.

The fiber connected node and the server are informed of the failed route or the use of micro-routes and any other route anomalies. They are also given information on links that are operational on signal level, signal headroom, fading margin etc.

The Cloud computes all routes from the Distribution Node to the destination node. These are downloaded into the fiber connected unit. In an alternate embodiment of the invention, they are downloaded into an auxiliary units attached to the fiber connected unit. When the fiber connected unit receives a packet for a MAC address it adds the routing header on it, and sends it to the appropriate adjacent unit. The routing header tells a unit as to which sector to transmit the packet, and the beam "number" on that sector. The unit strips the parameters from the route header exposing the next one for the receiving unit. The fiber connected unit will round robin through equal cost or near equal cost routes for load balance on the network.

If a communications failure occurs, the node first retransmits the packet. If that fails, it tries a micro-route or an alternate route computed by the Cloud. If these fail, it returns the packet to the last unit ($DN_{n-1}$ unit) that sent it. The $DN_{n-1}$ unit has a list of alternate routes for each destination node, pre-computed by the Cloud Controller and downloaded to that unit. It modifies the routing header using one of these and retransmits the packet. This process is repeated until the packet is either returned to the Distribution Node, or it is delivered. If it is returned to the Distribution Node, that node resends it on a different path.

When a failure occurs, the sending unit may delete the failed primary path, the alternate paths, and/or the micro-route from its routing table, and propagates this information to the other nodes in the network, including the fiber connected node. The sending unit may also restrict the use of the primary path, certain alternate paths, and/or the micro-route between the updating of the routing table by the Cloud. The fiber connected node reports this information to the Cloud. Only the Cloud processing can reestablish this route. In an alternate embodiment, instead of deleting a micro-route based on a single failure, a failure counter is maintained for each micro-route, and only when a pre-defined threshold is exceeded, is the micro-route deleted.

The means of detecting a static reflector are to collect reflection data at different times of day or days of week or month or year. If the reflected path appears in all of them accounting for the variance of beam pointing errors, it is deemed to be a static reflector. Dynamic reflectors that have a known periodicity may also be used but as a function of that periodicity.

Figure 8:
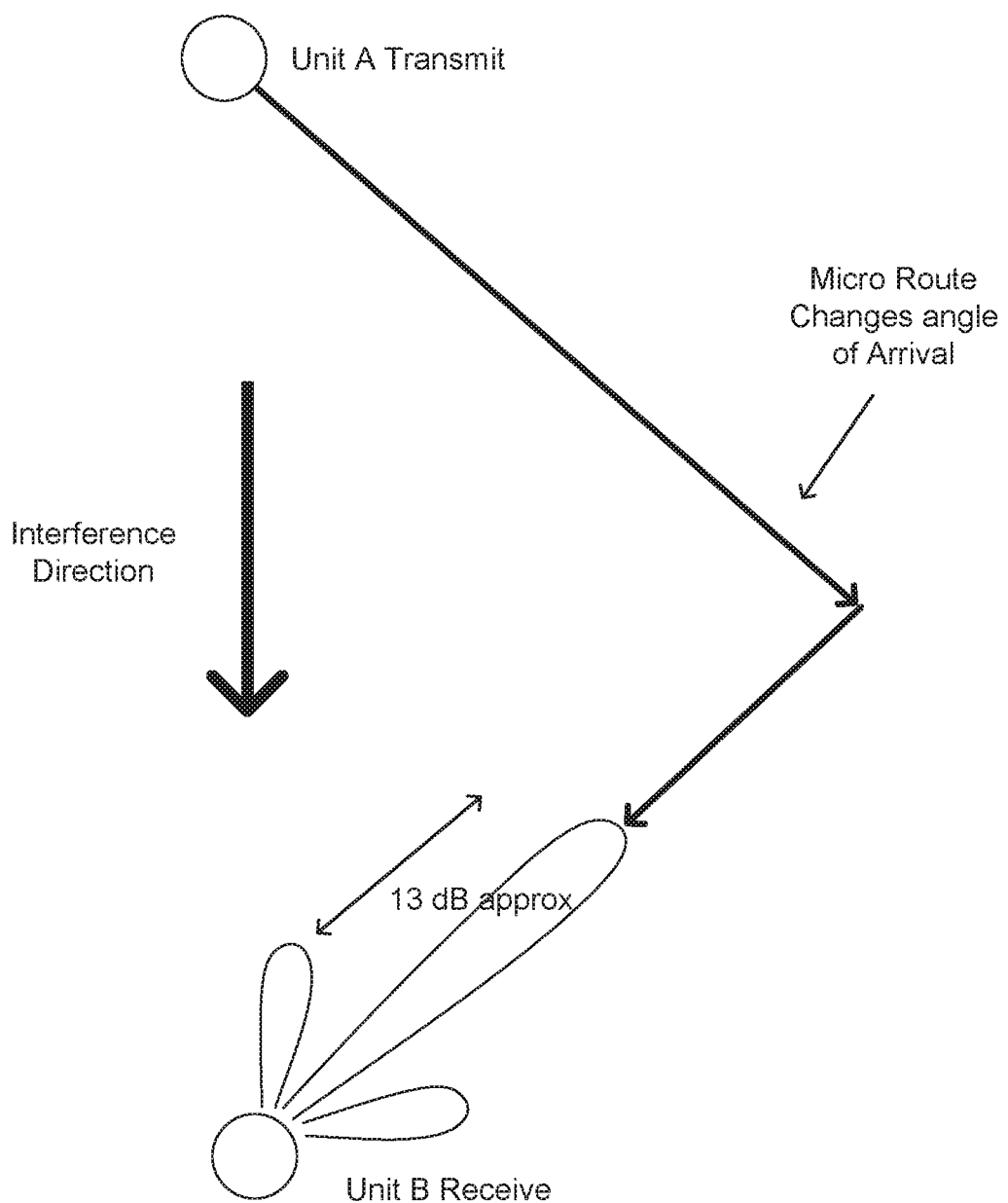
FIG. 8 shows interference suppression using a micro route in the next generation data network, in accordance with one embodiment of the present invention.

By using a micro-route, rather than the direct path, the Next Generation Network changes the arrival angle of the signal at the receiver. This allows the network to maximize the signal to interference ratio at the receiver. For example, typical side-lobe to main-lobe gain is −13 dB, and a typical micro-route loss is 3 dB. In this case, the improvement in C/I is 10 dB. (FIG. 8)

Micro Route+ Modulation

In this case we use the microroute and reduce the modulation & effective data rate on the link. For example if we increased the margin by 6 dB from modulation-data rate then our effective margin over the interferer is 16 dB.

Micro Route+ Interference Cancellation

Figure 9:
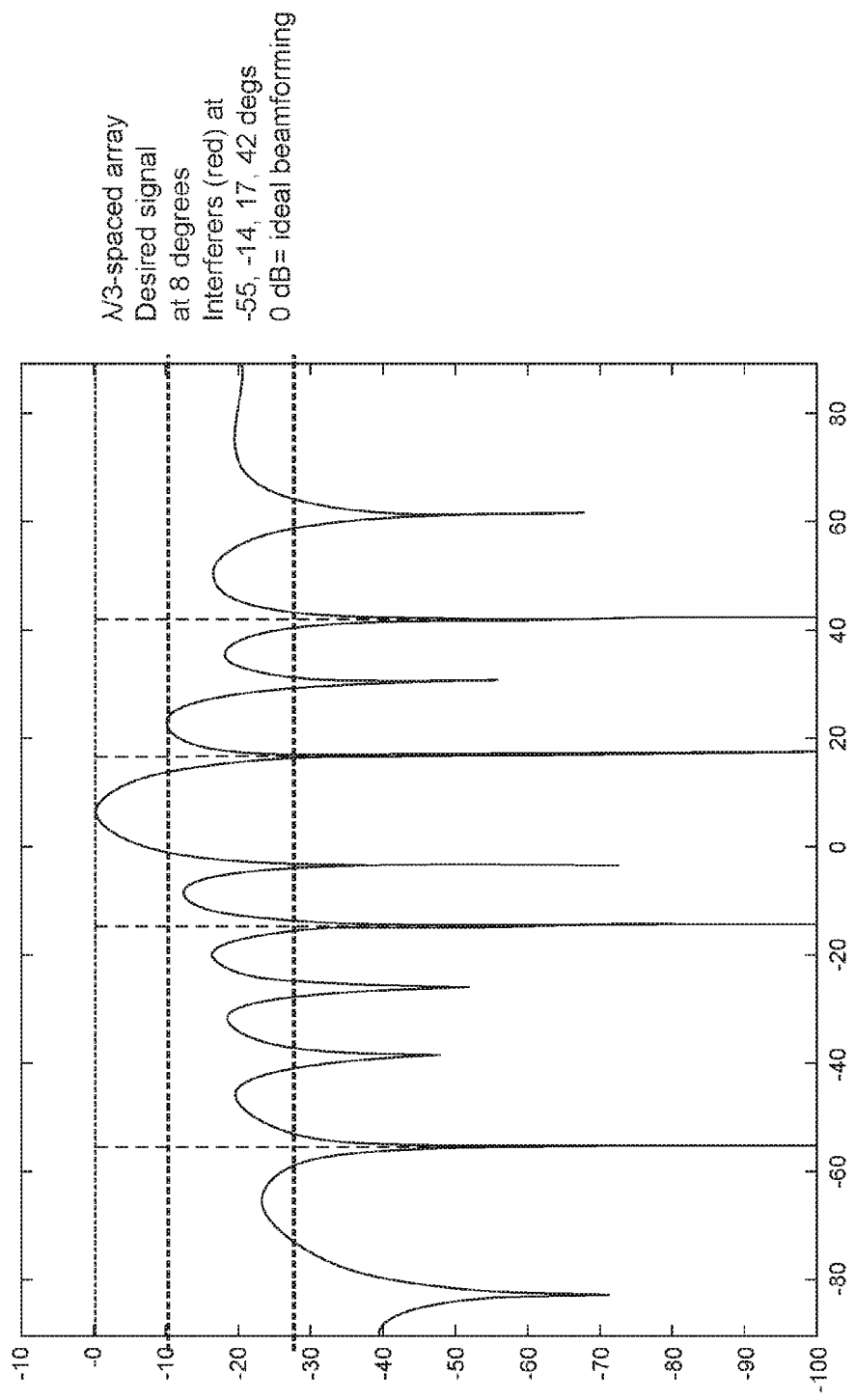
FIG. 9 shows the beamforming characteristics of a spatial interference canceller used in the next generation data network, in accordance with one embodiment of the present invention.

We use a spatial interference canceller (FIG. 9). The canceller does an "inverse beam former" or creates a null in a direction. We have shown that these nulls maybe as deep at 28 dB over and above antenna isolation. In this case we have an effective margin of 38 dB over the interference.

Micro Route+Interference Cancel+Modulation

In this case if we had a 6 dB advantage from modulation-data rate our effective margin is now 44 dB.

Single Frequency Networks

We enable the complete network to be run on a single frequency channel rather than alternating frequencies. This enables the most efficient usage of the frequency spectrum. We achieve this via RF Maps. Using the RF Maps we 1. Compute Power levels for the unit to transmit a packet (knowing its destination). Computed power levels reflect the real world power that is required to close the link at a desired reliability/availability level. It is important not to transmit at max power where we can use lower power to minimize self interference in the network.

2. Beam pointing coefficients coordinated with the packet transmission sequence across exception pair links. This eliminates the "exception pairs" generated by the RF Maps function 3. Synchronization and synchronization offsets for irregular deployments. In a regular or symmetric deployment alternate nodes transmit and receive. In an irregular deployment there may be multiple DNs on a path corresponding to one link on another path that need to be synchronized.

4. Managing C/I (Carrier to Interference ratio) at nodes via transmit power, modulation, packet sequence and beam pointing coefficients. The C/I is managed so that the packet can be delivered with a reliability level that has been guaranteed to the user.

5. Use 3D RF maps to compute off axis self interference combinations
   a. Auto measure sidelobe performance;
   b. Utilize the self interference cross correlation matrix to eliminate transmit receive combinations (beam weights);
   c. Achieved via packet scheduling.

Virtual Networks

Multiple virtual networks can be created over the same hardware links. These networks can each be assigned data bandwidth at the fiber node(s). The reason is that the fiber node determines total throughput of the network. Further, we can overbook each network if required using statistics that are available historically and that we have collected on the nature of the burstiness of the data. This will allow us to allocate bandwidth dependent on the guaranteed level of service for each virtual Network.

Network Coexistence

Multiple Operators may plan to use our equipment in the same area, and maybe on the same poles. Using communication between our cloud controllers we can manage the frequency, the synchronization of transmit and receive slots to minimize interference and maximize throughput. Further we can also coordinate packet sequencing between these networks to maximize antenna isolation both from beamforming and polarization. The SFN is key to making these networks operate as it increases the degrees of freedom that we have to operate both in frequency and/or polarization.

Network and SubNet Synchronization & Security

The network uses two levels of synchronization. Coarse synch using GPS to a nominal of 100 nanoseconds and a fine synch that using signaling between units. Sub nets are synchronized in the cloud and their transmit, receive, and beam pointing along the edges of subnets is coordinated and synchronized. Further subnet coordination also utilizes the sparse data or low data densities of the links at the periphery of each subnet to maximize data traffic in the core of each subnet. The core is defined as the fiber DN and the first hop DNs. Security leverages on the delays between units and time of travel between units. Using this as a key we "open" the packets only at the destination. Further due to the assignment of different routes along which the packet may travel, assigned at the fiber attached node the key is randomized. Further error bounds are placed to account for retransmits that maybe encountered along the way. Alternatively we can add "incremental" keys in each DN to account for retransmits.

Figure 3:
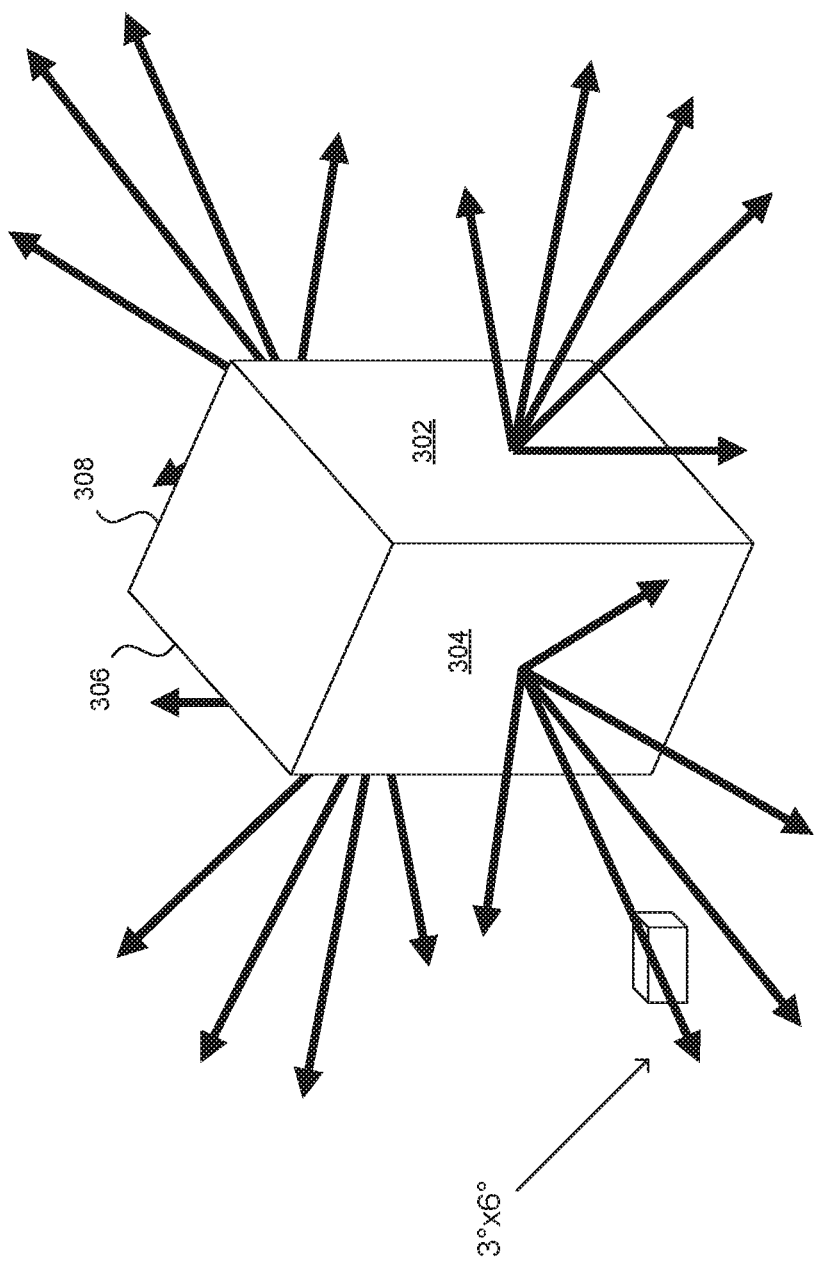
FIG. 3 shows the four sectors of a distribution node, in accordance with one embodiment of the present invention.
Figure 4:
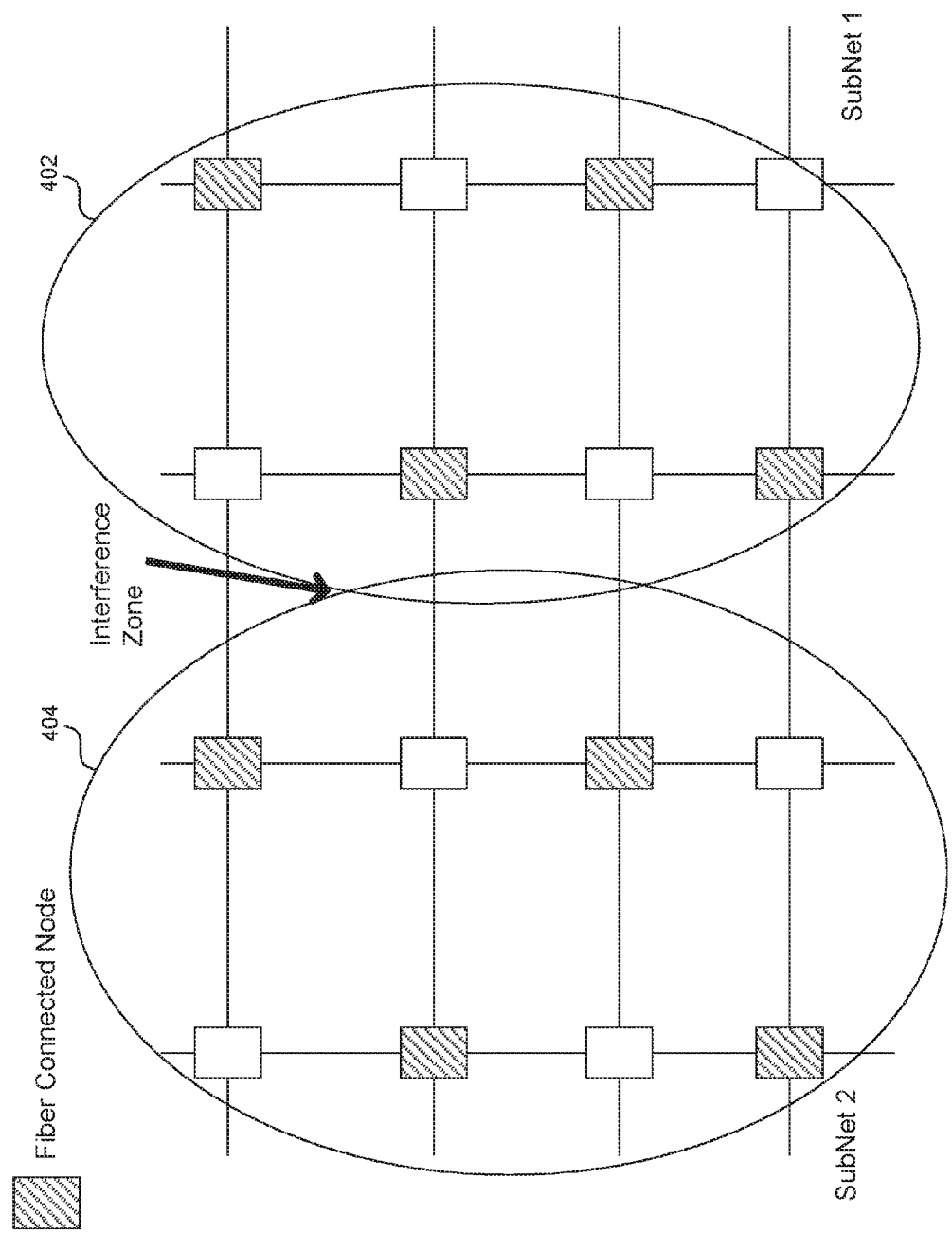
FIG. 4 shows the next generation data network split into subnets each associated with a subset of fiber connected nodes, in accordance with one embodiment of the present invention.

Distribution Node (FIG. 3)

Figure 10:
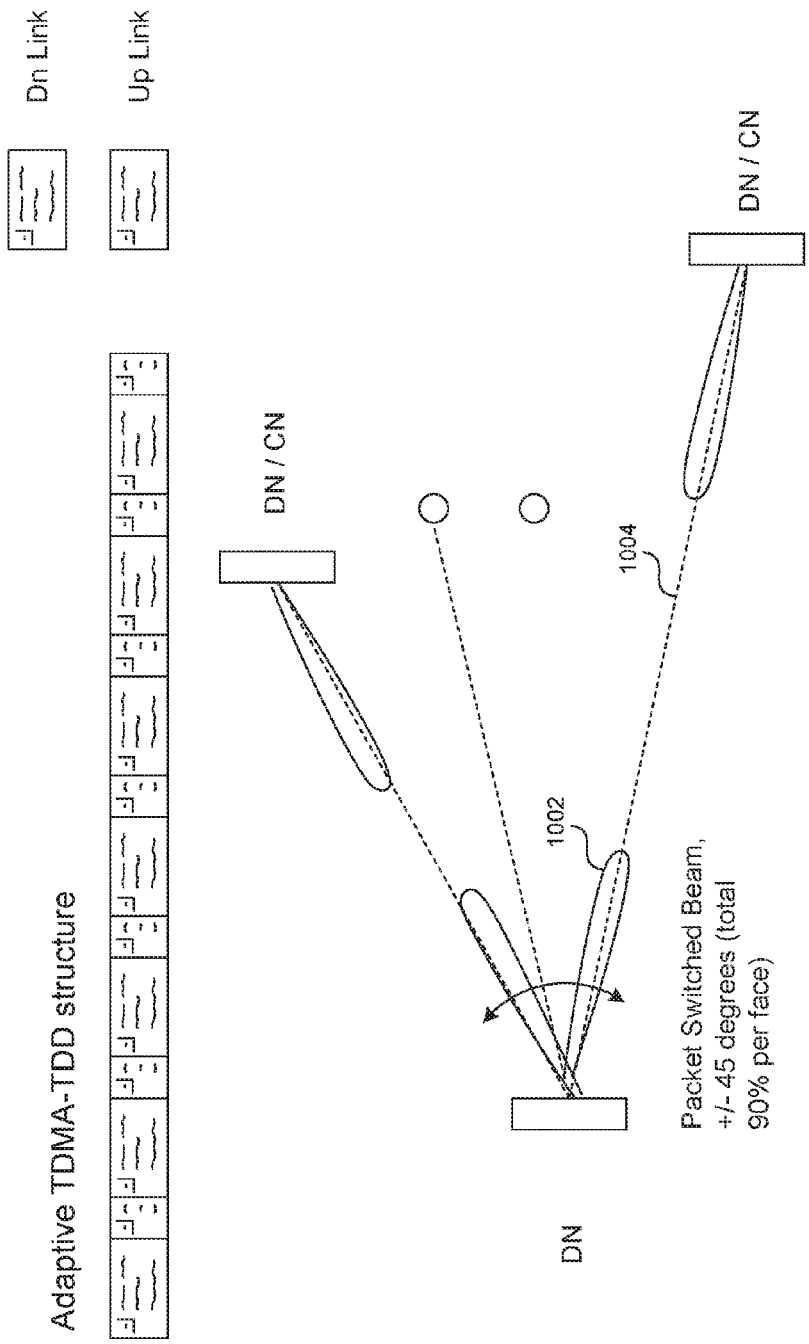
FIG. 10 shows packet switched beams transmitted by a distribution node of the next generation data network, in accordance with one embodiment of the present invention.
Figure 11:
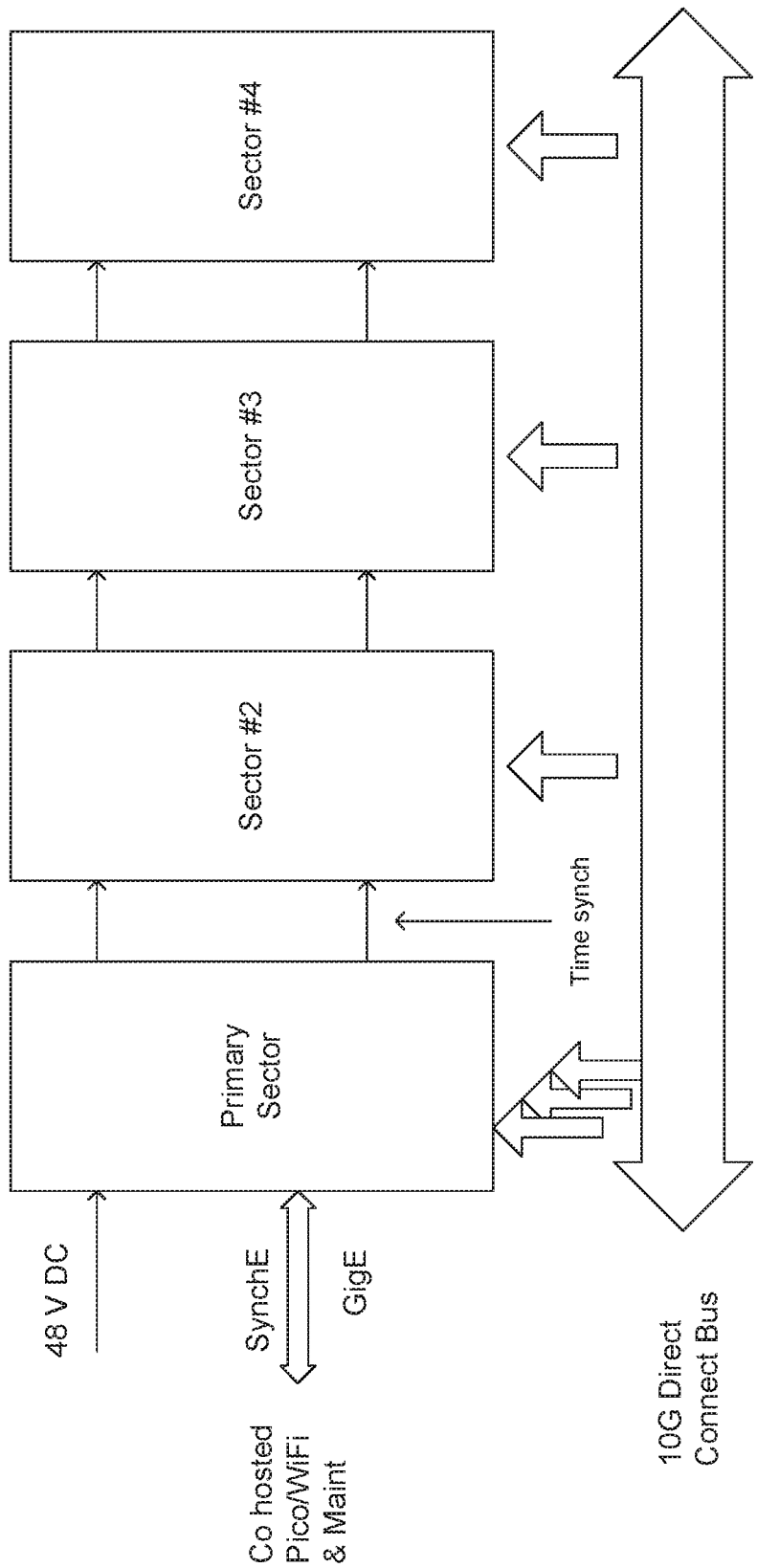
FIG. 11 shows the block diagram of the four sectors of a distribution node of the next generation data network, in accordance with one embodiment of the present invention.

Describes nodes in a millimeter wave multi-hop network that provide high data rates (of the order of multiple Gigabits per second), flexible deployment (not requiring manual aiming of antennas) and robustness to multipath fading. FIG. 3 shows a node with 4 faces or sectors 302, 304, 306, 308. All sectors transmit and receive at the same time. Each sector has a packet switched beam. That is the beamforming coefficients are applied to enable the sector to point the beam at the client or receiver of the packet to be transmitted. Further, the beam 1002 is then switched to point (FIG. 10) in the direction 1004 of where the next packet needs to be sent. Each sector has a table of MAC or IP addresses and beamforming coefficients that the sector is authorized to communicate with. There may be multiple sets of beamforming coefficients for the main beam or a range assigned to each coefficient. Micro route beamforming coefficients are also included in this table. All 4 sectors are synchronized, one sector is the master and the other 3 sectors are the slaves (FIG. 11). All sectors transmit OFDM signals. However, the system can work with single carrier signals The nodes can perform adaptive transmit and receive beamforming, and provide omnidirectional coverage as well as high antenna directivity, That is, each node can communicate with neighbors in any direction of its choosing in a 360 degree field of view, while being able to synthesize a highly directive beam in the direction of the node that it is communicating with at a given time. Link robustness is achieved by providing diversity against fading, which can occur due to multipath reflections from surfaces such as the ground, building walls, or vehicles. The throughput available at each node is increased by allowing for multiple simultaneous links with different neighbors.

The reason for multi-hop/mesh is that it permits us to "look" around corners/buildings and extend the distance we cover. By having multiple routes to the destination we also increase the effective availability/reliability of the network.

Figure 12:
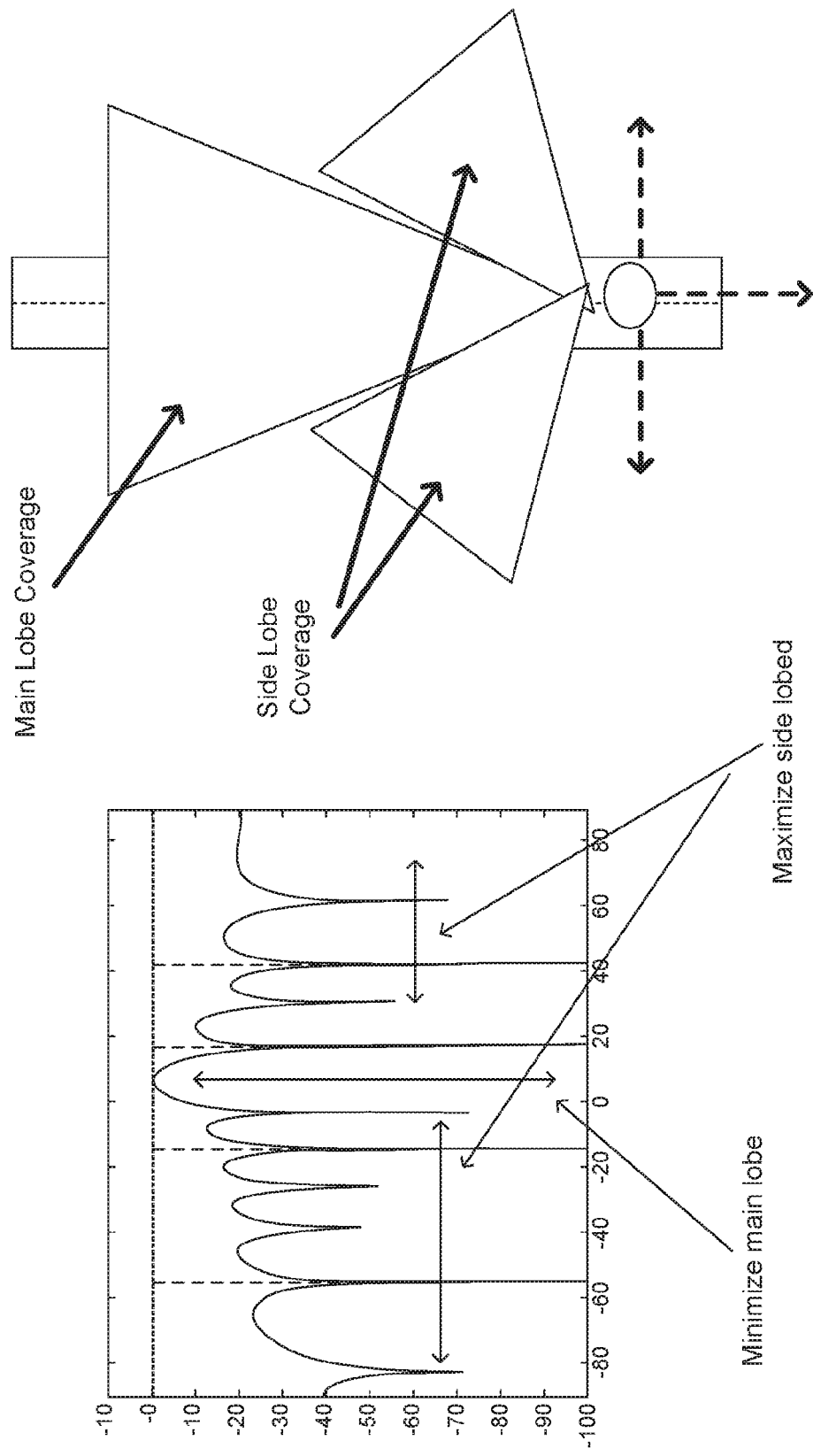
FIG. 12 shows using beamforming to maximize the coverage region of the side lobes for communication in the next generation data network, in accordance with one embodiment of the present invention.

There are two node types, distribution nodes (DNs) and a client node (CNs). A distribution node has up to four sectors, each covering 6 degrees×90 degrees (we can change this coverage for 2D beamforming cases), The fundamental beam is approximately 6 degrees×3 degrees and is beam formed to sweep over the complete angle. Each sector has a beam that can be pointed +/−45 degree. Further, we can reduce the coverage area but utilize the sidelobes to communicate with the close in clients who maybe on the extremities. For example (FIG. 12), we can reduce the actual antenna coverage to 6 degrees×45 degrees, and use the beamforming to maximize the coverage region (that is maximize the side lobes rather than main lobe). That is clients in the 22.5 degrees on either side of the coverage region are communicated to by the sidelobes. These links can be closed at a lower transmit EIPR as the clients are closer in and/or at a lower data rate. This enhances the link for the "trunk" connections. These nodes are reconfigurable for other angular coverage, which can include beam forming in elevation in addition to azimuth.

In an alternate embodiment, a two dimensional (2D) sweep is used. This 2D beam forming has an n×m degree beam that can be steered vertically in elevation and horizontally in azimuth. This embodiment is used for building top to building top as buildings are at different heights. It is also used to illuminate the side of a building from the street or top of another building.

Figure 13:
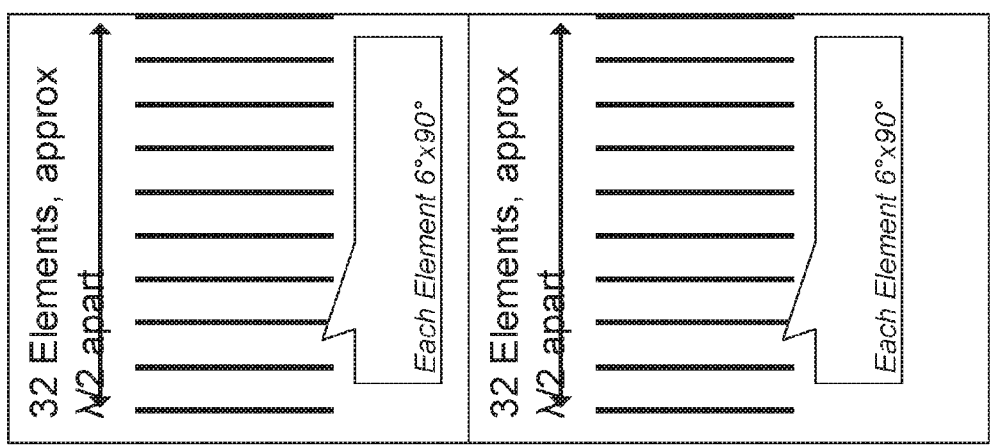
FIG. 13 shows the elements of the antenna arrays of a sector of a distribution node or a client node in the next generation data network, in accordance with one embodiment of the present invention.

The antenna array has 32 elements, each 6 degree by 90 degree (FIG. 13). In alternate embodiments, it may have 16, 12 or any other number of elements. There are two such arrays per sector. On transmit, both arrays are used with an Alamouti code that permits mitigating multipath effects and increases the transmit power via combining. On receive, both arrays are used with MRC combining.

Figure 14:
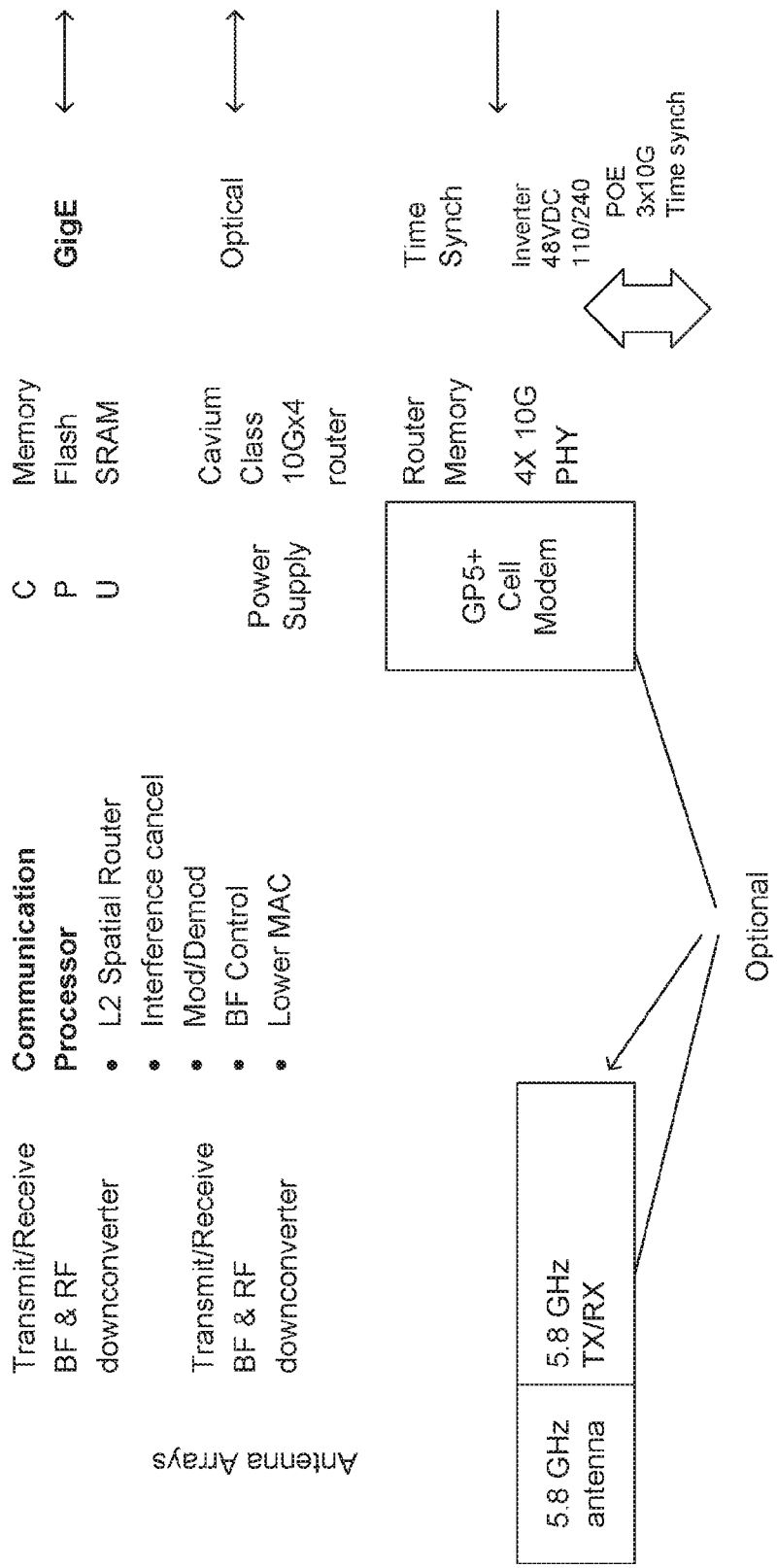
FIG. 14 shows the block diagram of a sector of a distribution node of the next generation data network, in accordance with one embodiment of the present invention.
Figure 15:
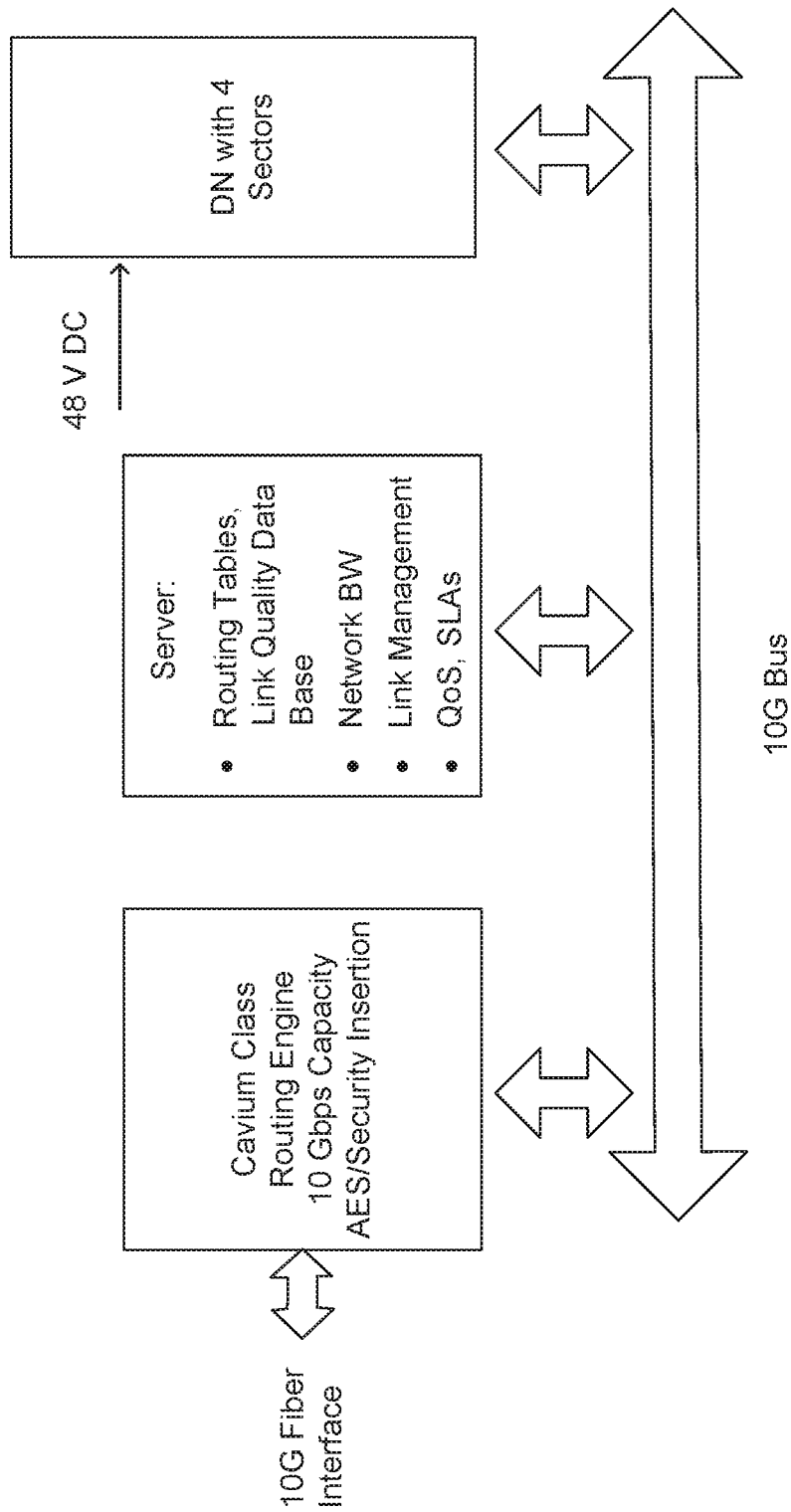
FIG. 15 shows a bus interconnection between the sectors and fiber 1/0 in a distribution node of the next generation data network, in accordance with one embodiment of the present invention.

A block diagram of the sector is shown in FIG. 14. It consists of the antenna arrays, which feed into the beamforming chips. These chips can be n element chips for simplicity we describe a 32 element beamformer. These beamformer chips use the coefficients for a packet on transmit or receive. We assume a single transmit/receive chip for each antenna array. We can have a separate transmit and receive chip with a switch or separate arrays for transmit and receive. These chips can output/input the combined RE signal at baseband or an IF frequency. This signal is modulated/demodulated by the communication processor which filters, combines signals from the two antennas for receive or generates two signals on transmit. It also has a QAM/QPSK mod/demod function with error coding. Other functions are shown in the FIG. 14 as an example. The MAC function is part of this processor it can be in the baseband chip or a separate FPGA. Further Mac filtering takes place that is the routing header is looked at to determine where it goes and is sent to the appropriate sector directly or via the primary sector. We can use the 10 G bus as the interconnect bus or multiple 10 buses or some other digital bus between the sectors. Connection to fiber 1/0 is shown in FIG. 15.

The multipath propagation characteristics for a highly directive mm wave link are quite sparse. Spatial diversity is provided by using multiple transmit and/or receive arrays offset in the horizontal and vertical directions. The horizontal offset provides diversity against wall reflections, while the vertical offset provides diversity against ground reflections. The amount of offset is chosen based on typical link ranges and typical distances from scattering surfaces. Thus, each receive antenna array would generate a single mm wave signal. For diversity combining of signals from multiple receive arrays, these signals can be further combined by adjusting gain and phase (e.g., based on a maximal ratio combining strategy), or one of the signals can be selected (e.g., based on amplitude or power). This can then be sent to the single channel chipset.

Each node has a centralized controller that routes packets to and from the appropriate faces. Isolation between the radio frequency (RF) circuits for different faces is sufficient that all faces can simultaneously transmit, or simultaneously receive. By designing higher layer protocols appropriately, the need for a face to transmit while another face is receiving can be avoided, thus greatly simplifying the isolation requirements.

An additional means of increasing data rate and interference rejection could be to use polarization coding and reverse polarize the two antennas in the sector. We could take this approach for doubling the effective throughput I:0 from the unit.

In one embodiment, output from the unit is GigE, SynchE; power into the unit is 48V DC, 110 VAC, 240 VAC; and interconnects between the sectors is via a multiple gigabit Ethernet ports or a single 100 port.

Other Functions and Components in the System 1. 3D RF Maps

Figure 16:
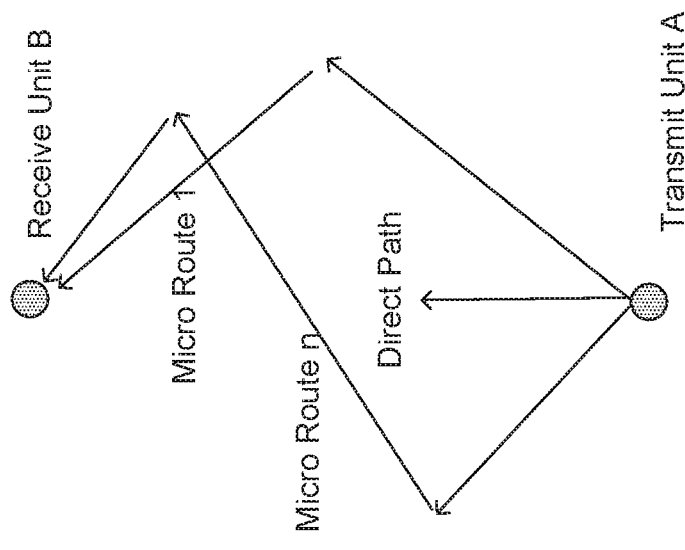
FIG. 16 shows characterization of the RF environment for reflection using RF maps in the next generation data network, in accordance with one embodiment of the present invention.

We need to characterize the RF environment for reflections (FIG. 16), interference (FIG. 5), and link losses. Characterization is done using probe packets. While we discuss a two dimensional case, the maps are generalized for three directions. With vertical scanning (or elevation scanning on the beam) we can characterize the reflectors, interference and side lobes in three dimensions. For simplicity of understanding we discuss a two dimensional case.

Figure 17:
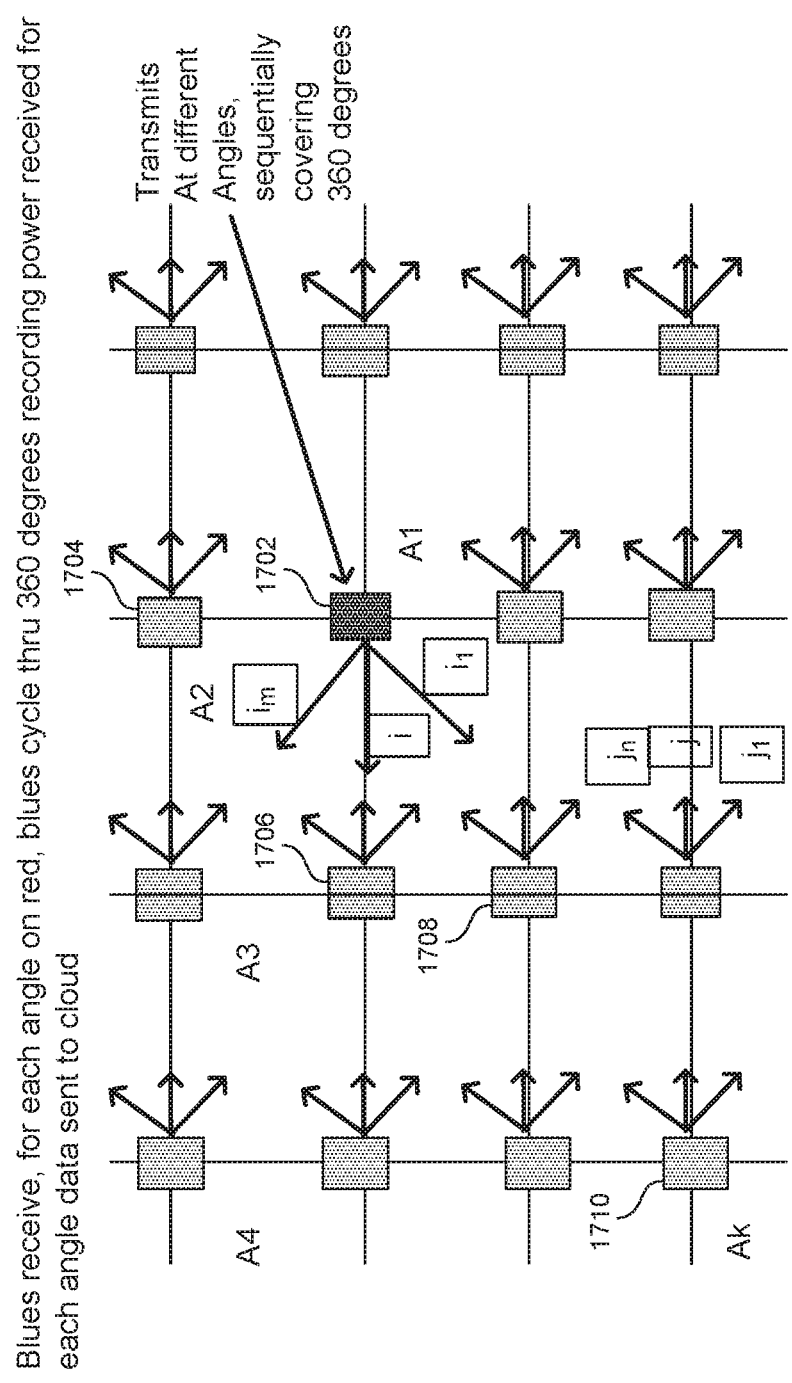
FIG. 17 shows data collection of transmit angels, receive angles, and received power from the transmitter and receivers of a next generation data network for generating RF maps, in accordance with one embodiment of the present invention.

To do this we start with a transmit beam on unit A 1702 and receive on all "surrounding" units 1704, 1706, 1708. The number or depth of surrounding units is based on the propagation losses. Data collection is performed as follows (see FIG. 17).

Unit A1 1702 transmits at angle i. All units 1704, 1706, 1708 receive at angle j. And then at j+1, j+2, . . . n;

Unit A1 1702 then transmits at angle i+1, units receive at j, j+1, . . . n;

Unit A1 transmits at angle m, all units receive at j, j+1, . . . n;

Unit A2 transmits in the same sequence as A1 (above), all units receive the A2 signal at j, j+1, . . . n;

Unit Ak 1710 transmits at angle m, all units receive the Ak signal at j, j+1, . . . n.

The data collected on transmit receive are transmitted to the server in the cloud. The data consists of transmit angle or beamforming parameters and receive angle or beamforming parameters, received signal transmit power, multipath parameters if any.

Note transmit and receive signals are shown as "geometric" for simplicity of explanation; however these beams may be "amoeba shaped". For example, amoeba shaped beams may be constructed from a combination of geometric beams from the multiple antenna elements (e.g., 32) of the antenna array. The amoeba shaped beams may be used to increase the probability of packet reception or to increase the date rate via independent paths. In one embodiment, amoeba shaped beams may be created between two nodes independent of the Cloud.

The data analytics function in the server or super unit or possibly in each unit, sorts through the data to compute reflected paths and interference between units. For each of these a signal power level is associated, a modulation parametric set is associated which may include distortion of the QAM constellation etc.

This data collection exercise can be performed on a periodic basis or ad hoc. The data collected can be incremental, that is we do not have to collect all data in one contiguous set but can be distributed over time. Further we will re-explore the reflected paths periodically, further the two units using the reflected path may further optimize beam parameters between them to optimize communication.

Whenever there is no traffic or periodically the units are set to scan one transmitting and one or several receiving. We correlate the transmit power and "angle" with what receivers see again, received power and angle. The angles can be in azimuth and elevation.

To make a single frequency network we use the RF Maps to pin point interference between cells. As both "cells" have beam forming we create "packet exclusions," that is if a packet is being sent to a client then the interfered node will not look (receive/transmit) in that direction while this operation is in progress.

RF Roads are angular Transmit-receive combinations. Discover RF roads between units using the scanning beams;

RF Roads have data speed, reliability, and exclusion zones;

For desirable roads—permanent reflectors are sourced by collecting data repeatedly over time.

Weather & Environment Tool

Figure 18:
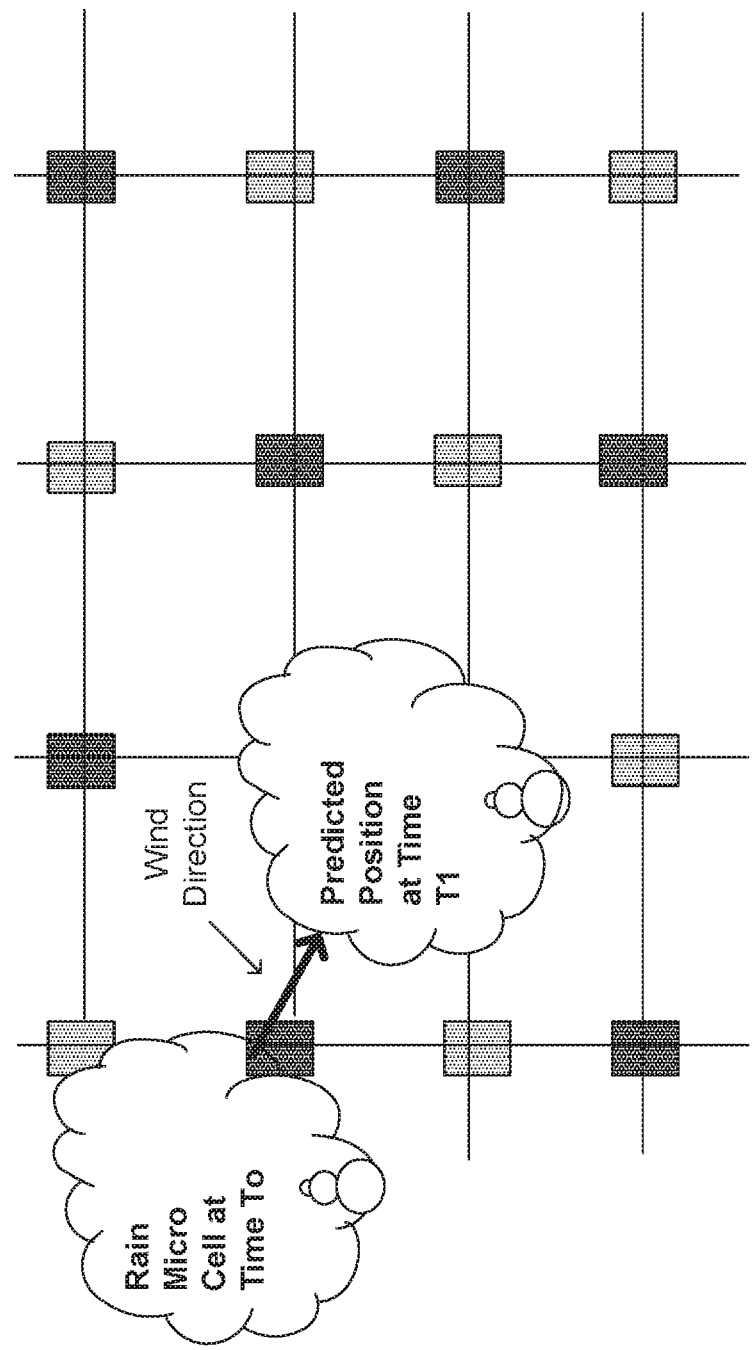
FIG. 18 shows prediction of rain microcell to reroute traffic around the rain microcell in the next generation data network, in accordance with one embodiment of the present invention.

Using Met data we are aware or rain & wind storms 1802 that may degrade the performance of our links. When we see a link degrade due to rain we can predict the motion of the rain microcell via met data (wind direction & speed). This prediction is used to route traffic around the rain microcell and link capacities in the rain micro cell will be reduced (FIG. 18).

Figure 19:
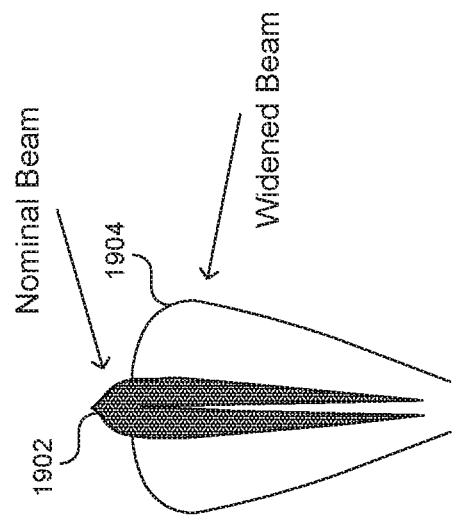
FIG. 19 shows beam widening to maintain lock on a particular link of the next generation data network, in accordance with one embodiment of the present invention.

For wind we collect data on degradation of the beam— that is we may have to widen a beam to maintain lock on a particular link. We can use this data that we have collected historically, to predict effects in a wind storm which will require that we predict and widen the beam 1902, 1904 (FIG. 19), and reduce the data rate to maintain the link budget. Further we can use wind direction in the storm to predict specifics of beam parameters and how they are affected. (Beam may only need to be widened for particular wind directions).

3. Beam Parameter Computation

Coarse beam parameters are computed on the server. These are geometric in nature and downloaded to the unit. Further the server can also compute perturbations on these parameters that the unit can try and then categorize by performance. Initial beams maybe computed using the known GPS locations of the two end of the link and approximate direction of the sector face. By using multiple measurements to various destinations that the sector can communicate with, the Cloud Controller can compute the "nominal" direction of the sector (that is at 0,0).

When a new unit is added to the network its geographic location is entered into the provisioning system. The appropriate DNs and their appropriate sectors (using GPS data) will look for the new unit. The new unit is in receive & scan mode unit it acquires the invitation to join the network from a DN. AES keys maybe exchanged before it is permitted to enter the network. Further, it will receive the definition of transmit slots, etc., from the DNs.

The perturbations can be for enhanced performance for multipath (reflectors have been characterized in RF Maps) or for interference cancellation, or both. The interference cancellation nulls can be pre-computed based on beam directions and cancellation nulls in other directions. Perturbations for antenna imperfections are also taken into account and calibrated in the Cloud Controller. This is similar to the process to calibrate misalignment or the mounting angle of the sector.

Transmit or receive beamforming can be performed based on any of a number of well-known mechanisms, including beamforming at radio frequency (RF) or intermediate frequency (IF) by controlling the relative gains and/or phases of each element, or beamforming in complex baseband by controlling the complex gains of the baseband signal to/from each element for transmit/receive beamforming.

The beamforming and diversity functionalities can be modularized and implemented in a number of ways. As one example, sophisticated integrated circuits developed for short range (e.g., indoor) applications can be leveraged for the longer range outdoor applications considered in this disclosure. As FIG. 14 show, a single channel chipset that handles up/down conversion, baseband processing, and link layer/medium access protocols, can be used for each face. Alternatively, Beamforming chipsets customized for the outdoor application can be layered on top of single channel RF up/downconvertor chips. In order to control line losses, it is advantageous to place a beamforming integrated circuit (IC) close to the antenna array that it is controlling. For transmission, a transmit beamforming IC would take the mm wave signal from the single channel chipset. replicate the signal for each transmit element, provide power amplification, and modulate the gain and phase to beamform in the appropriate direction. The amount of power amplification would be set so as to adhere to regulatory guidelines on radiated power, while overcoming line and coupling losses from the single channel chipset to the antenna elements. For reception, a receive beamforming IC would provide low noise amplification as close to the antenna elements as possible (so as to improve the overall noise figure), while adjusting the gain and/or phase of the received signal at each element before summing these signals to implement receive beamforming.

4. Routing Tool

For each fiber point or broadband point of presence (a high bandwidth link for taking and bringing data from carrier/internet) and each destination MAC address on our network, we pre-compute the possible routes with a cost function. The net of the cost function is characterized in data rate, delay, and reliability of packet delivery. It also takes into account the availability of multiple routes between two units using micro routes.

Further, for rerouting/routing failures, once a unit determines it cannot communicate on its primary path it utilizes pre-stored micro routes or an alternate path from the routing table. If these fail it sends the packet back to the $DN_{n-1}$. $DN_{n-1}$ has a list of pre-computed routes for a destination mac address. $DN_{n-1}$ replaces the packet routing header with one of the pre-computed routes that does not utilize a "failed" route.

The fiber connected node and the server are informed of the failed route or the use of microroutes and any other route anomalies. They are also given information on links that are operational on signal level, signal headroom, fading margin etc.

Routing is computed based on RF parameters/statistics of each link and traffic on the link, to maximize probability of packet delivery at its destination. The routing tool can also order increased time coding of packets for error recovery, usually applied to high priority/critical packets and also for lossy links, For destinations that can only be reached via excessively lossy links the routing tool may order two or more copies of the packet to be sent on distinct routes, where the receiving client has the responsibility to reconstruct the original packet from error corrected fragments of the original packet. Further for excessively lossy links the routing tool may order a large packet be broken down into smaller sub packets.

Routing header may include:

Route number, sector number, beam number, power to transmit at, modulation and error correction parameters, number of bits;

Route number+ 1 , sector number, ...
...
Ethernet port address;
Data;
...
Data.

5. Micro Route;

Micro-route is a reflected route, pre-computed in the cloud using "RF Maps" The parameters (beam angle, modulation, coding, tx power, . . . ) for these routes are downloaded to the unit and then fine-tuned by the unit. Micro routes utilize "static reflectors" who properties are known as a time of day or are static over all time.

The means of detecting a static reflector are to collect reflection data at different times of day or days of week of month or year. If the reflected path appears in all of them accounting for the variance of beam pointing errors, it is deemed to be a static reflector. Dynamic reflectors that have a known periodicity may also be used but as a function of that periodicity, Micro route information also includes beam parameters, data rate, modulation, error correction and other parameters to let the units know how to close the link at a required reliability level. Multiple micro routes between two units can be downloaded and prioritized.

The other usage for micro routes is for interference management. By changing the angle of arrival of the signal it can present a side lobe of the antenna gain pattern to the interference. Micro routes are periodically tested along with all other routes by the Cloud Controller.

I claim:

1. A method, comprising:
   receiving a plurality of packets to be sent from a distribution node of a wireless network to a plurality of destination nodes in the wireless network, the wireless network including a plurality of nodes forming a multi-hop mesh network, the plurality of nodes including the distribution node and the plurality of destination nodes;
   for each packet in the plurality of packets, determining a route for the packet from the distribution node to the destination node via the plurality of nodes through wireless transmission through one or more wireless hops;
   determining an order of the packets to be transmitted from the distribution node to mitigate interference of a wireless transmission of a particular packet from any node in a route for the particular packet with a wireless transmission of other packets; and
   transmitting the packets in the plurality of packets in accordance with the order of the packets.

2. The method of claim 1, wherein determining the order of the packets to be transmitted from the distribution node to mitigate interference of the wireless transmission of a particular packet from any node in the route for the particular packet with a wireless transmission of other packets includes:
   accessing an RF map for the wireless network, the RF map characterizing the RF environment of the wireless network;
   determining, based on the RF map, that the transmission of the particular packet from at least one node in the particular route will cause interference with the transmission of other packets; and
   ordering the transmission of the particular packet from the distribution node relative to the other packets to mitigate interferences of the wireless transmission of the particular packet from the at least one node with the wireless transmission of other packets.

3. The method of claim 2, wherein the wireless interference includes interference between two or more nodes.

4. The method of claim 3, wherein ordering the transmission of the particular packet includes ordering the transmission of the particular packet so that when a transmit beam of the at least one node is pointed in a direction that would cause interference with a receive beam of nodes other than a desired destination node, the receive beam of these nodes are pointed away from the transmit beam.

5. The method of claim 1, wherein wireless network operates on a single frequency band.

6. The method of claim 1, wherein wireless network operates on two separate frequencies, and wherein each frequency forms a separate and distinct wireless mesh network.

7. The method of claim 1, wherein the distribution node is coupled to a high-bandwidth link.

8. The method of claim 1, wherein after determining the route for the packet, the method includes, appending the route to a routing header for the packet.

9. The method of claim 8, wherein the routing header includes one or more of beam forming parameters for transmit and receive nodes in the route, error correction parameters, and packet metadata.

10. A system, comprising:
   a wireless network including a plurality of nodes forming a multi-hop mesh network, the plurality of nodes including a distribution node coupled to a high-bandwidth link;
   a server configured to:
      receive a plurality of packets to be sent from the distribution node of a wireless network to a plurality of destination nodes in the wireless network;

for each packet in the plurality of packets, determining a route for the packet from the distribution node to the destination node via the plurality of nodes through wireless transmission through one or more wireless hops;

determining an order of the packets to be transmitted from the distribution node to mitigate interference of a wireless transmission of a particular packet from any node in a route for the particular packet with a wireless transmission of other packets; and transmitting the packets in the plurality of packets in accordance with the order of the packets.

11. The system of claim 10, wherein while determining the order of the packets to be transmitted from the distribution node to mitigate interference of the wireless transmission of a particular packet from any node in the route for the particular packet with a wireless transmission of other packets, the server is configured to:

access an RF map for the wireless network, the RF map characterizing the RF environment of the wireless network;

determine, based on the RF map, that the transmission of the particular packet from at least one node in the particular route will cause interference with the transmission of other packets; and order the transmission of the particular packet from the distribution node relative to the other packets to mitigate interferences of the wireless transmission of the particular packet from the at least one node with the wireless transmission of other packets.

12. The system of claim 11, wherein the wireless interference includes interference between two or more nodes.

13. The system of claim 12, wherein ordering the transmission of the particular packet includes ordering the transmission of the particular packet so that when a transmit beam of the at least one node is pointed in a direction that would cause interference with a receive beam of nodes other than a desired destination node, the receive beam of these nodes are pointed away from the transmit beam.

14. The system of claim 10, wherein wireless network operates on a single frequency band.

15. The system of claim 10, wherein wireless network operates on two separate frequencies, and wherein each frequency forms a separate and distinct wireless mesh network.

16. The system of claim 10, wherein the distribution node is coupled to a high-bandwidth link.

17. The system of claim 10, wherein after determining the route for the packet, the method includes, appending the route to a routing header for the packet.

18. The system of claim 17, wherein the routing header includes one or more of beam forming parameters for transmit and receive nodes in the route, error correction parameters, and packet metadata.

* * * * *